(12) United States Patent
Huang et al.

(10) Patent No.: US 12,016,032 B2
(45) Date of Patent: Jun. 18, 2024

(54) COMMUNICATING MULTIPLE TRANSPORT FORMATS IN A SLOT WITH FULL-DUPLEX

(71) Applicant: QUALCOMM Incorporated, San Diego, CA (US)

(72) Inventors: Min Huang, Beijing (CN); Chao Wei, Beijing (CN); Yuwei Ren, Beijing (CN); Yu Zhang, Beijing (CN); Qiaoyu Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 17/310,715

(22) PCT Filed: Feb. 28, 2020

(86) PCT No.: PCT/CN2020/077072
§ 371 (c)(1),
(2) Date: Aug. 19, 2021

(87) PCT Pub. No.: WO2020/207143
PCT Pub. Date: Oct. 15, 2020

(65) Prior Publication Data
US 2022/0191838 A1 Jun. 16, 2022

(30) Foreign Application Priority Data
Apr. 6, 2019 (WO) ............... PCT/CN2019/081634

(51) Int. Cl.
*H04W 72/23* (2023.01)
*H04L 5/14* (2006.01)
(Continued)

(52) U.S. Cl.
CPC ............... *H04W 72/23* (2023.01); *H04L 5/14* (2013.01); *H04W 52/143* (2013.01); *H04W 52/346* (2013.01)

(58) Field of Classification Search
CPC ............ H04W 52/143; H04W 52/346; H04W 72/044; H04W 72/23; H04L 5/14; H04L 5/16
See application file for complete search history.

(56) References Cited

U.S. PATENT DOCUMENTS 10,491,343 B2   11/2019  Rico Alvarino et al.
2013/0188530 A1*  7/2013  Pirskanen ......... H04W 72/0453
                                                     370/280
(Continued)

FOREIGN PATENT DOCUMENTS

CN      103906242 A    7/2014
EP      3429281 A1     1/2019
(Continued)

OTHER PUBLICATIONS

International Search Report and Written Opinion—PCT/CN2019/081634—ISA/EPO—Dec. 30, 2019.
(Continued)

*Primary Examiner* — Gary Mui
(74) *Attorney, Agent, or Firm* — Harrity & Harrity, LLP

(57) ABSTRACT

Various aspects of the present disclosure generally relate to wireless communication. In some aspects, a node may determine a first set of time-frequency resources, within a time duration, for full-duplex communications and a second set of time-frequency resources, within the time duration, for non-full-duplex communications. The node may transmit to a wireless communication device and based at least in part on determining the first set of time-frequency resources and the second set of time-frequency resources, an indication of the first set of time-frequency resources, the second set of (Continued)

time-frequency resources, and corresponding transport formats for the first set of time-frequency resources and the second set of time-frequency resources. Numerous other aspects are provided.

30 Claims, 22 Drawing Sheets

(51) Int. Cl.
*H04W 52/14* (2009.01)
*H04W 52/34* (2009.01)

(56) References Cited

U.S. PATENT DOCUMENTS

| | | | |
|---|---|---|---|
| 2013/0223294 A1 | 8/2013 | Karjalainen et al. | |
| 2015/0109969 A1* | 4/2015 | Celebi | H04L 5/0073 370/278 |
| 2015/0229461 A1* | 8/2015 | DiFazio | H04L 5/14 370/280 |
| 2015/0372801 A1* | 12/2015 | Smee | H04W 72/51 370/296 |
| 2016/0021651 A1* | 1/2016 | Ko | H04L 5/0053 370/329 |
| 2017/0223709 A1 | 8/2017 | Noh | |
| 2017/0302337 A1 | 10/2017 | Liu et al. | |
| 2017/0332376 A1 | 11/2017 | He et al. | |
| 2018/0212746 A1* | 7/2018 | Kazmi | H04L 5/14 |
| 2018/0316395 A1 | 11/2018 | Sundararajan et al. | |
| 2019/0068355 A1 | 2/2019 | Ode | |
| 2019/0081737 A1 | 3/2019 | Huang et al. | |
| 2019/0357149 A1* | 11/2019 | Zhang | H04W 52/146 |
| 2020/0367271 A1* | 11/2020 | Bai | H04W 72/20 |
| 2020/0374807 A1* | 11/2020 | Zhang | H04W 52/146 |
| 2021/0219329 A1* | 7/2021 | Zhou | H04L 1/189 |
| 2023/0015915 A1* | 1/2023 | Zhang | H04W 72/0446 |
| 2023/0275736 A1* | 8/2023 | Abdelghaffar | H04L 5/14 370/276 |
| 2023/0309128 A1* | 9/2023 | Duan | H04W 72/51 370/329 |

FOREIGN PATENT DOCUMENTS

| | | |
|---|---|---|
| GB | 2498559 A | 7/2013 |
| WO | 2016164865 A1 | 10/2016 |
| WO | 2017024441 A1 | 2/2017 |
| WO | 2017105407 A1 | 6/2017 |
| WO | 2017222137 A2 | 12/2017 |

OTHER PUBLICATIONS

International Search Report and Written Opinion—PCT/CN2020/077072—ISAEPO—May 18, 2020.
Supplementary European Search Report—EP20786827—Search Authority—The Hague—Dec. 5, 2022.

* cited by examiner

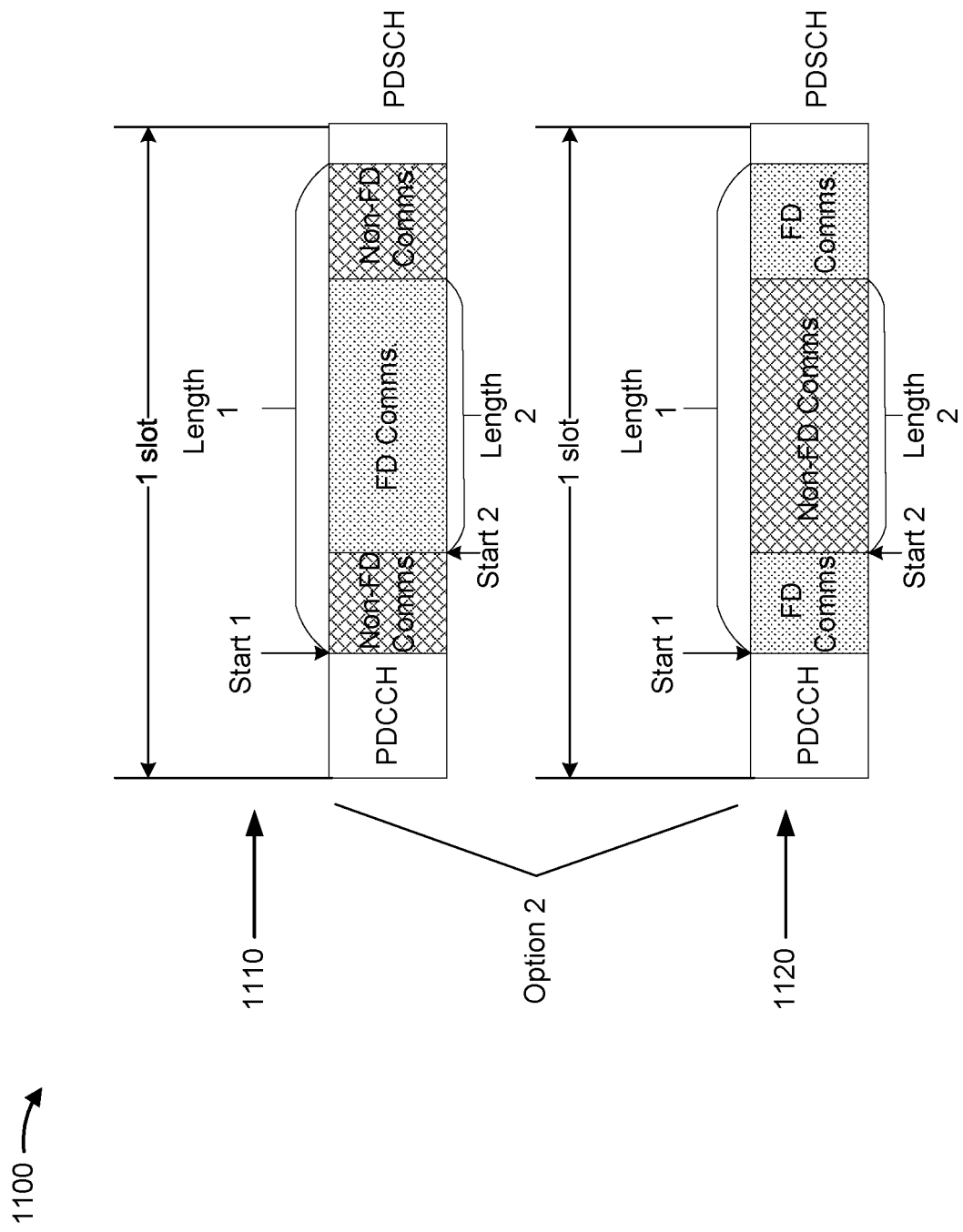

COMMUNICATING MULTIPLE TRANSPORT FORMATS IN A SLOT WITH FULL-DUPLEX

CROSS-REFERENCE TO RELATED APPLICATIONS

This application is a 371 national stage of PCT Application No. PCT/CN2020/077072 filed on Feb. 28, 2020, entitled "COMMUNICATING MULTIPLE TRANSPORT FORMATS IN A SLOT WITH FULL-DUPLEX," which claims priority to Patent Cooperation Treaty (PCT) Application No. PCT/CN2019/081634, filed on Apr. 6, 2019, entitled "COMMUNICATING MULTIPLE TRANSPORT FORMATS IN A SLOT WITH FULL-DUPLEX" which are hereby expressly incorporated by reference herein.

FIELD OF THE DISCLOSURE

Aspects of the present disclosure generally relate to wireless communication and to techniques and apparatuses for communicating multiple transport formats in a slot with full-duplex.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node (e.g., a base station), may include determining a first set of time-frequency resources, within a time duration, for full-duplex communications and a second set of time-frequency resources, within the time duration, for non-full-duplex communications, wherein the first set of time-frequency resources and the second set of time-frequency resources are to be associated with different transmit powers; and transmitting, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources.

In some aspects, a method of wireless communication, performed by a wireless communication device, may include receiving an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources, wherein the first set of time-frequency resources and the second set of time-frequency resources are to be associated with different transmit powers; and receiving, based at least in part on receiving the indication, a first transport block, on the first set of time-frequency resources, and a second transport block, on the second set of time-frequency resources, wherein the first transport block is modulated by a first transport format of the corresponding transport formats, and wherein the second transport block is modulated by a second transport format of the corresponding transport formats.

In some aspects, a node for wireless communication may include memory and one or more processors operatively coupled to the memory. The memory and the one or more processors may be configured to determine a first set of time-frequency resources, within a time duration, for full-duplex communications and a second set of time-frequency resources, within the time duration, for non-full-duplex communications, wherein the first set of time-frequency resources and the second set of time-frequency resources are to be associated with different transmit powers; and transmit, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources.

In some aspects, a wireless communication device for wireless communication may include memory and one or more processors operatively coupled to the memory. The memory and the one or more processors may be configured to receive an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources, wherein the first set of time-frequency resources and the second set of time-frequency resources are to be associated with different transmit powers; and receive, based at least in part on receiving the indication, a first transport block, on the first set of time-frequency resources, and a second transport block, on the second set of time-frequency resources, wherein the first transport block is modulated by a first transport format of the corresponding transport formats, and wherein the second transport block is modulated by a second transport format of the corresponding transport formats.

In some aspects, a non-transitory computer-readable medium may store one or more instructions for wireless communication. The one or more instructions, when executed by one or more processors of a node, may cause the one or more processors to: determine a first set of time-frequency resources, within a time duration, for full-duplex communications and a second set of time-frequency resources, within the time duration, for non-full-duplex communications, wherein the first set of time-frequency resources and the second set of time-frequency resources are to be associated with different transmit powers; and transmit, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources.

In some aspects, a non-transitory computer-readable medium may store one or more instructions for wireless communication. The one or more instructions, when executed by one or more processors of a wireless communication device, may cause the one or more processors to: receive an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources, wherein the first set of time-frequency resources and the second set of time-frequency resources are to be associated with different transmit powers; and receive, based at least in part on receiving the indication, a first transport block, on the first set of time-frequency resources, and a second transport block, on the second set of time-frequency resources, wherein the first transport block is modulated by a first transport format of the corresponding transport formats, and wherein the second transport block is modulated by a second transport format of the corresponding transport formats.

In some aspects, a first apparatus for wireless communication may include means for determining a first set of time-frequency resources, within a time duration, for full-duplex communications and a second set of time-frequency resources, within the time duration, for non-full-duplex communications, wherein the first set of time-frequency resources and the second set of time-frequency resources are to be associated with different transmit powers; and means for transmitting, to a second apparatus and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources.

In some aspects, a first apparatus for wireless communication may include means for receiving, from a second apparatus, an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources, wherein the first set of time-frequency resources and the second set of time-frequency resources are to be associated with different transmit powers; and means for receiving, from the second apparatus and based at least in part on receiving the indication, a first transport block, on the first set of time-frequency resources, and a second transport block, on the second set of time-frequency resources, wherein the first transport block is modulated by a first transport format of the corresponding transport formats, and wherein the second transport block is modulated by a second transport format of the corresponding transport formats.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
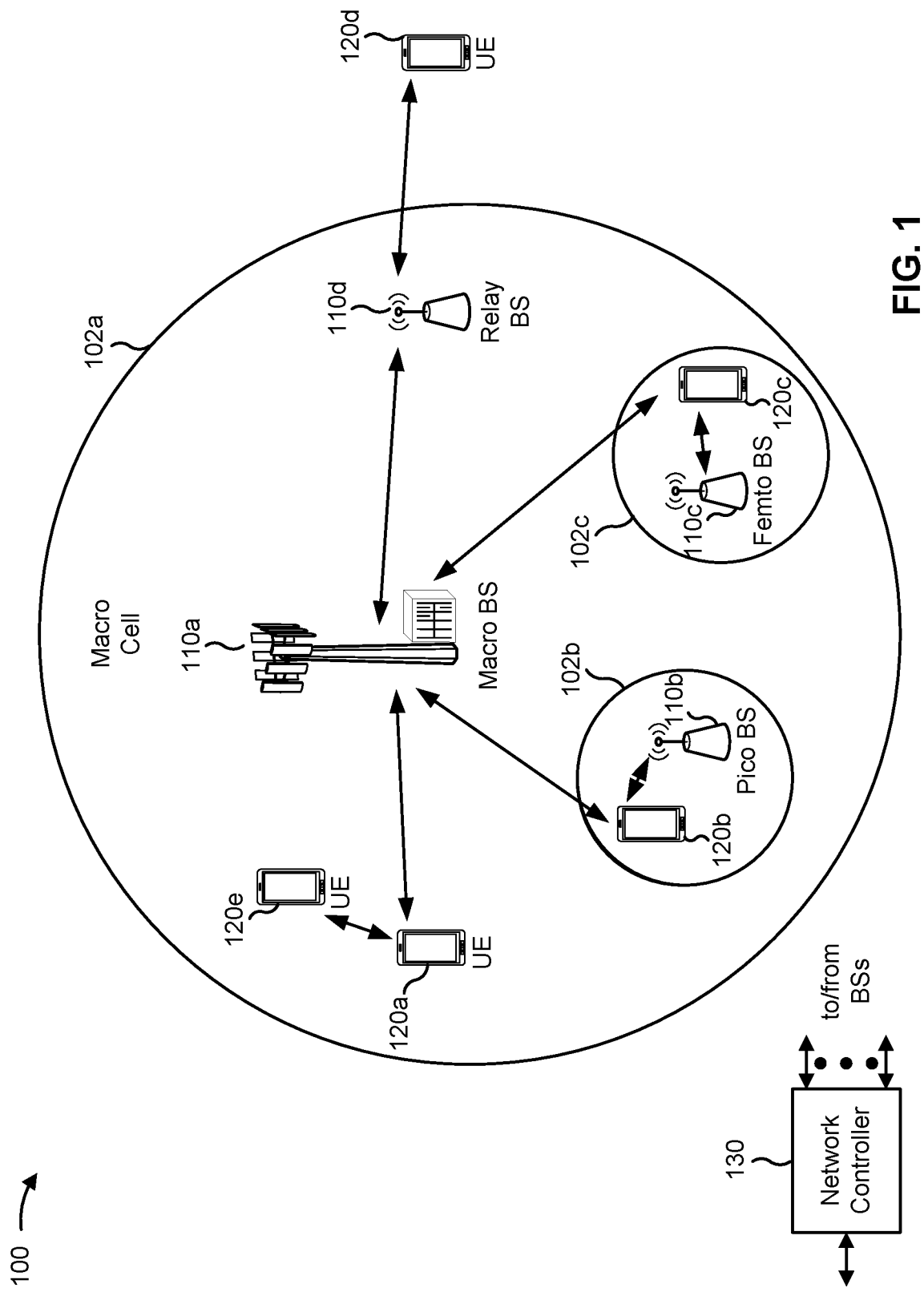
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
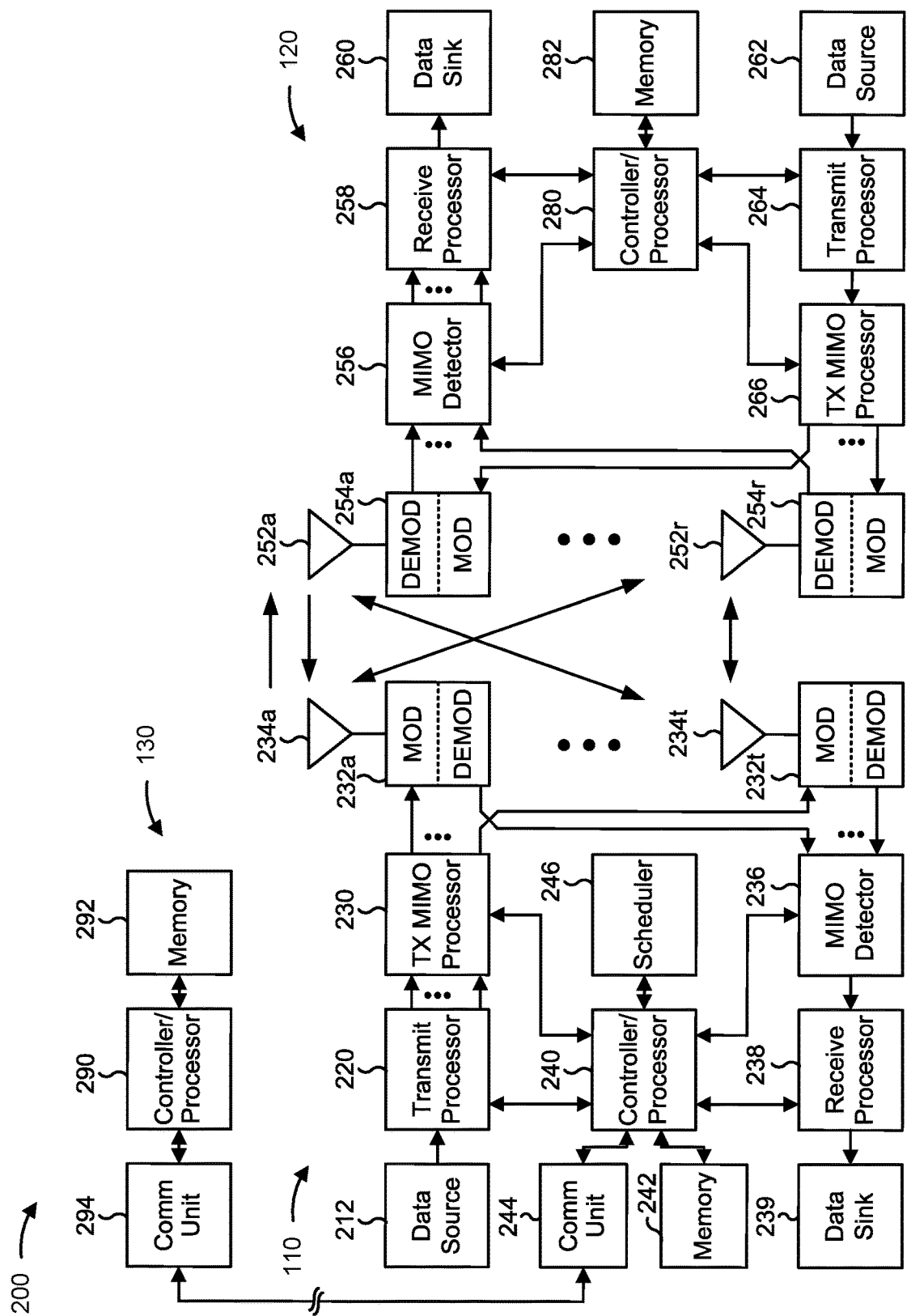
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with communicating multiple transport formats in a slot with full-duplex, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, a node (e.g., base station 110) may include means for determining a first set of time-frequency resources, within a time duration (e.g., a slot), for full-duplex communications and a second set of time-frequency resources, within the time duration (e.g., the slot), for non-full-duplex communications, wherein the first set of time-frequency resources and the second set of time-frequency resources are to be associated with different transmit powers; means for transmitting, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources; and/or the like. In some aspects, such means may include one or more components of base station 110 described in connection with FIG. 2.

In some aspects, a wireless communication device (e.g., BS 110, UE 120, an IAB donor, an IAB node, and/or the like) may include means for receiving (e.g., from a base station 110 or a node) an indication of a first set of time-frequency resources, within a time duration (e.g., a slot), for full-duplex communications, a second set of time-frequency resources, within the time duration (e.g., the slot), for non-full-duplex communications, and corresponding transport formats for the first set of time-frequency resources and the second set of time-frequency resources, wherein the first set of time-frequency resources and the second set of time-frequency resources are to be associated with different transmit powers; means for receiving, based at least in part on receiving the indication, a first transport block, on the first set of time-frequency resources, and a second transport block, on the second set of time-frequency resources, wherein the first transport block is modulated by a first transport format of the corresponding transport formats, and wherein the second transport block is modulated by a second transport format of the corresponding transport formats; and/or the like. In some aspects, such means may include one or more components of the wireless communication device described in connection with FIG. 2.

As indicated above, FIG. 2 is provided as an example. Other examples may differ from what is described with regard to FIG. 2.

Figure 3A:
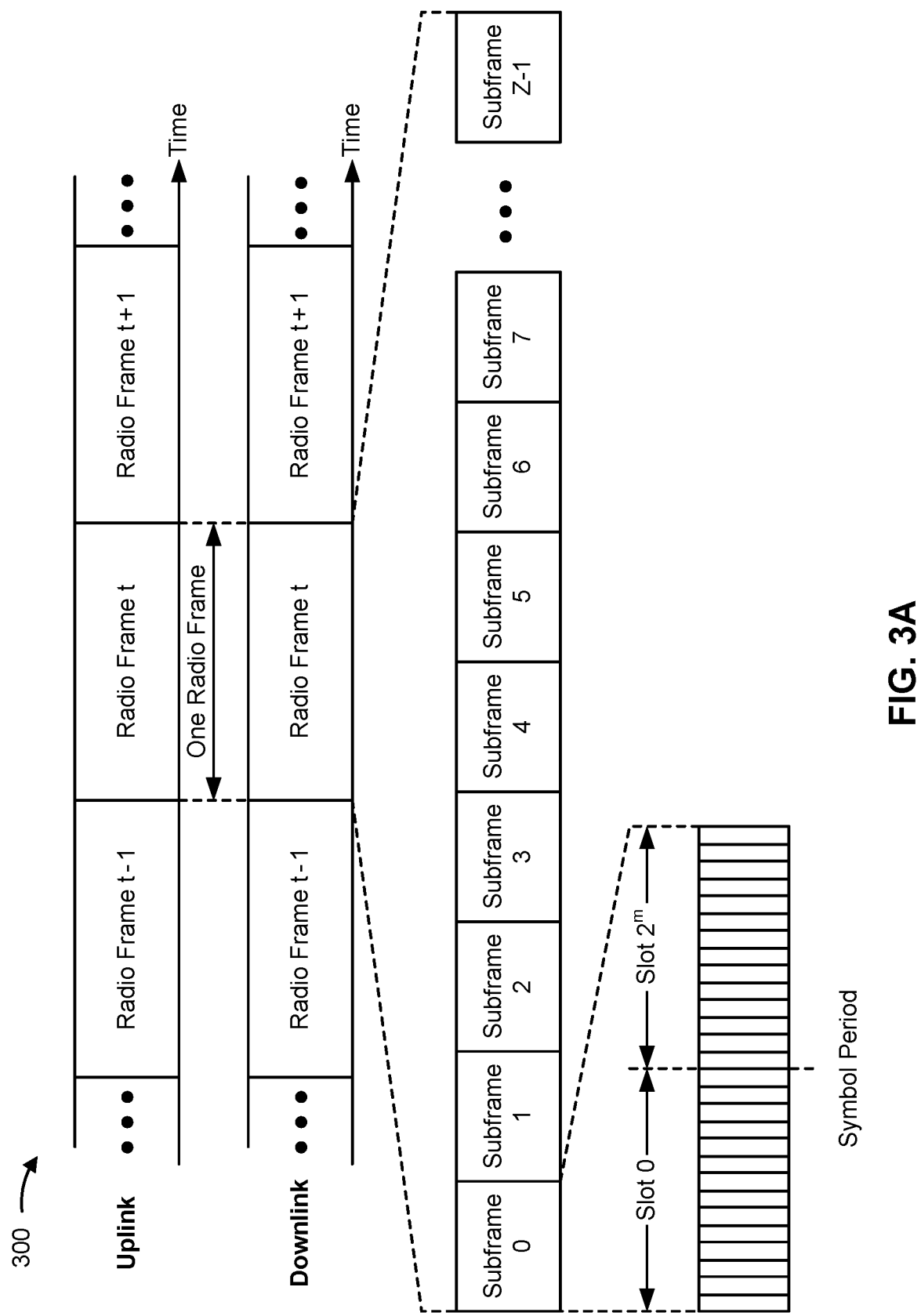
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
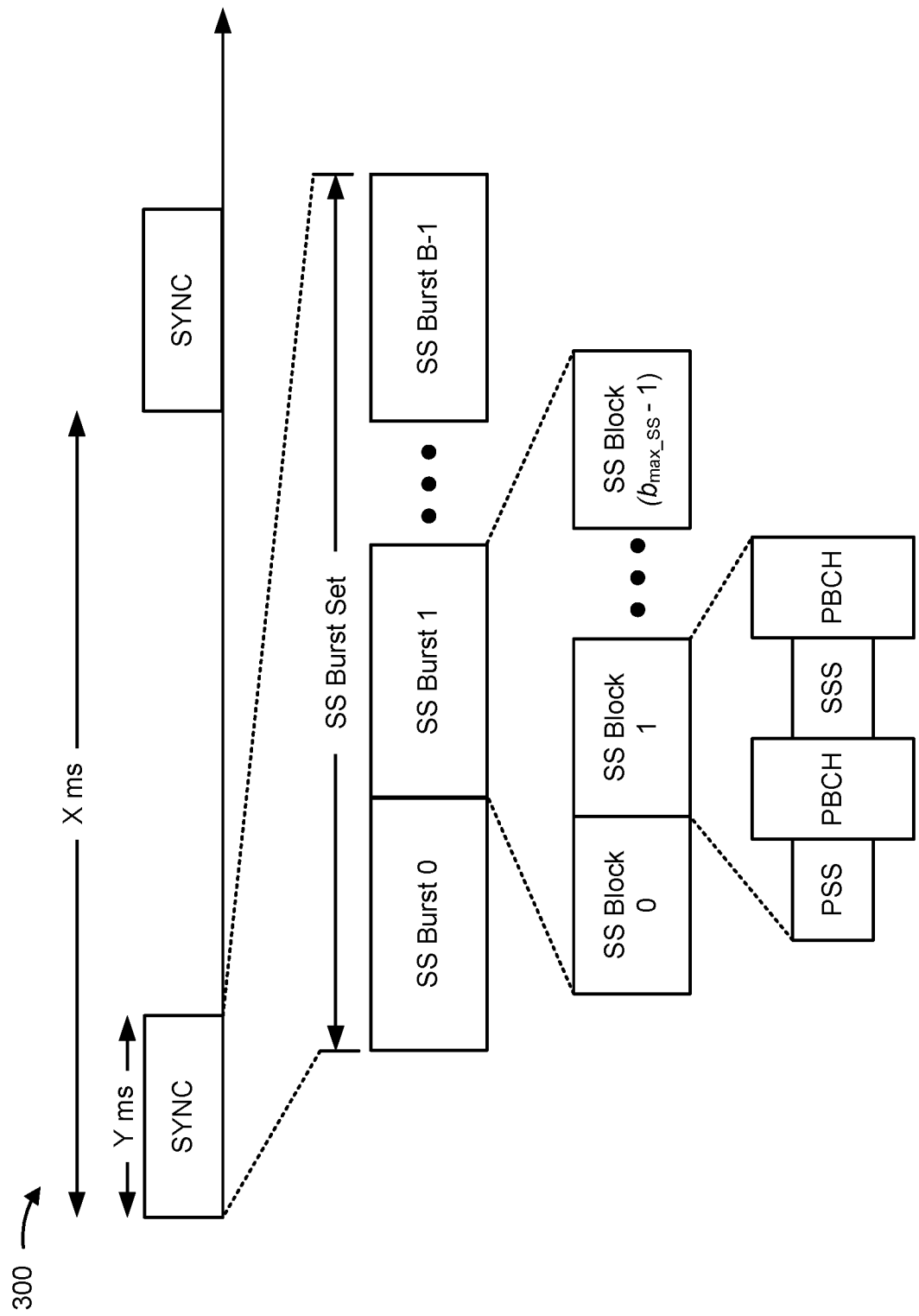
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBS) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
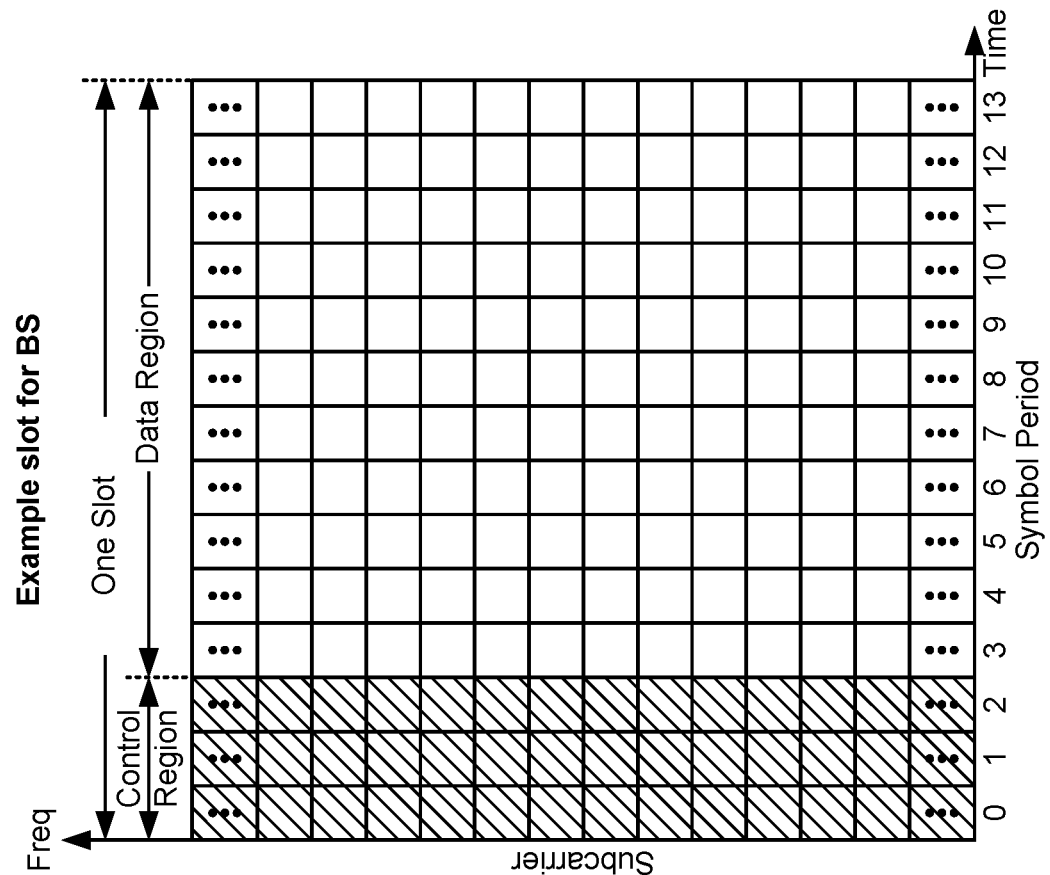
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q E $\{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD.

NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
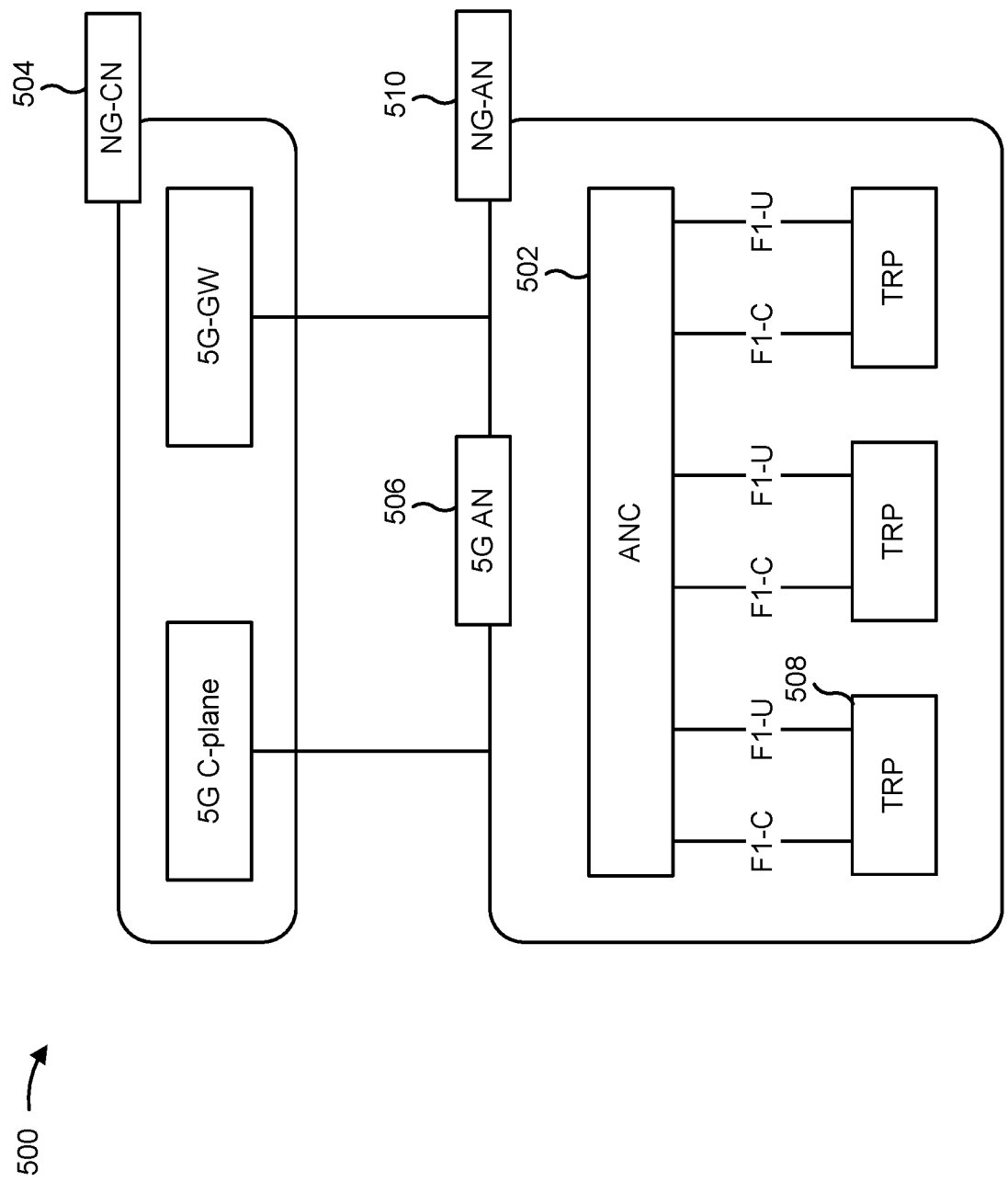
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
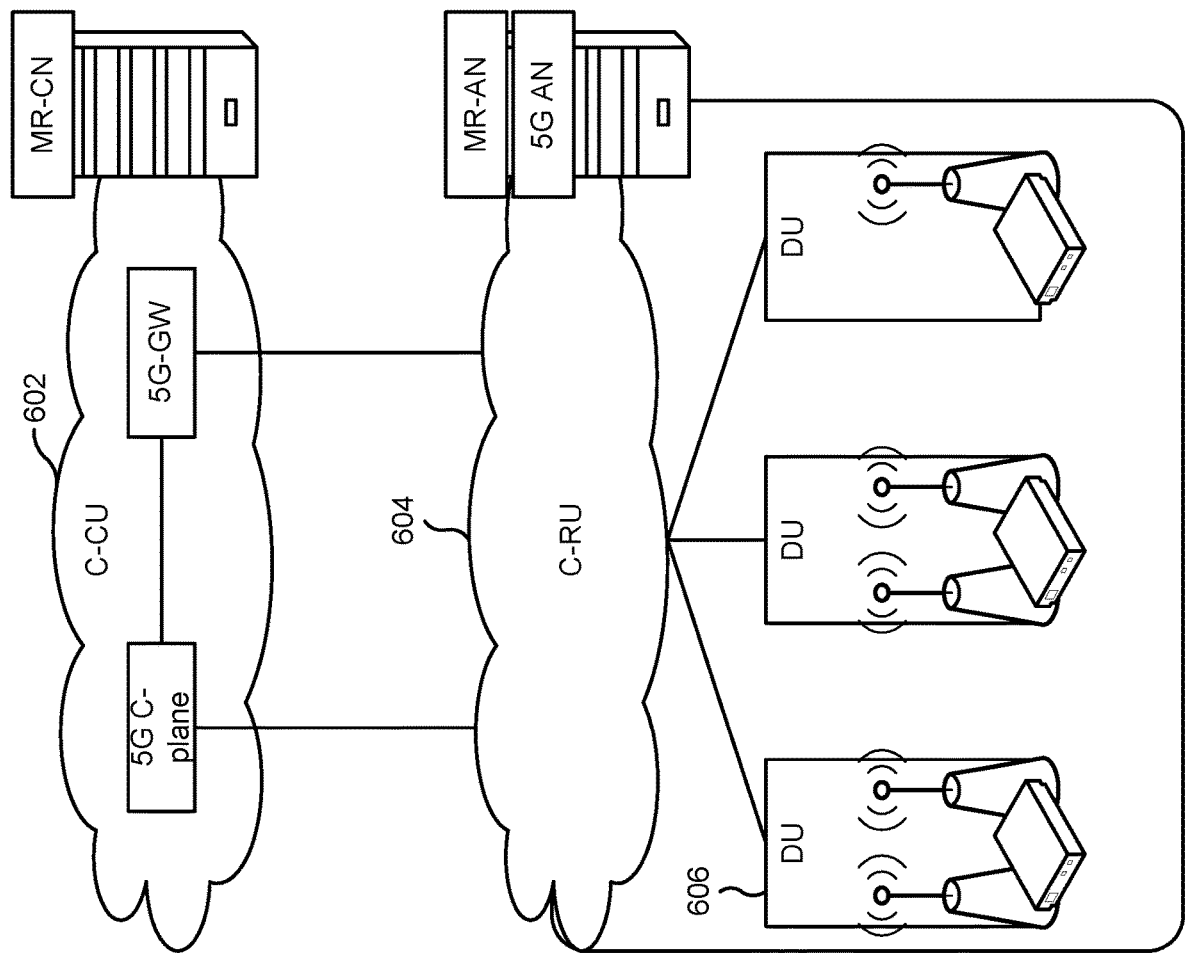
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
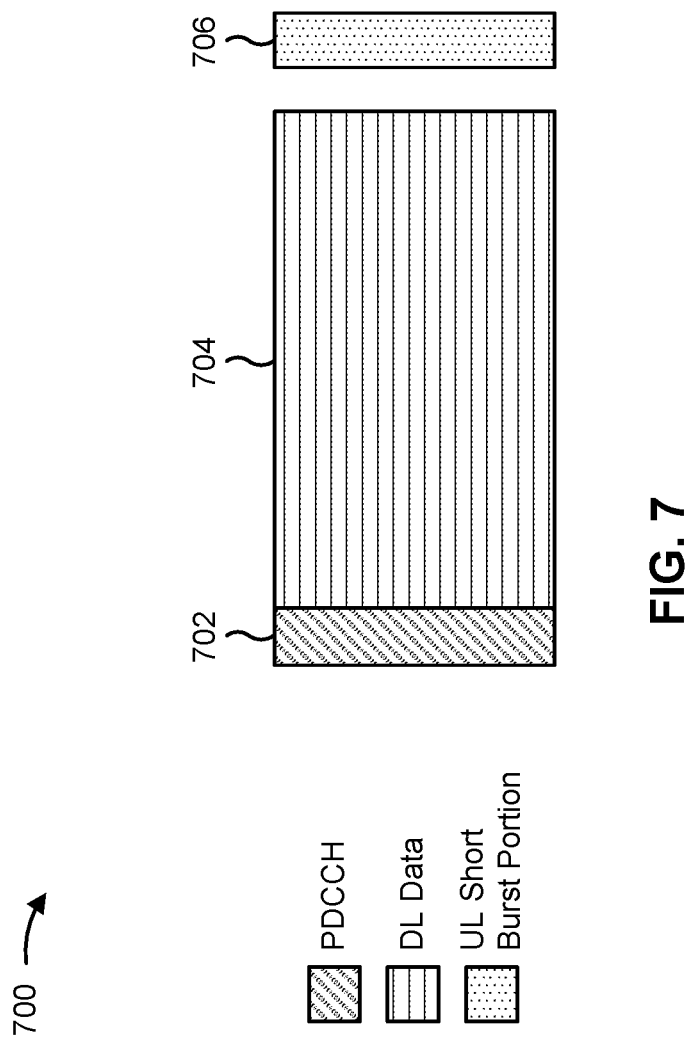
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals.

Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 7 is provided as an example. Other examples may differ from what is described with regard to FIG. 7.

Figure 8:
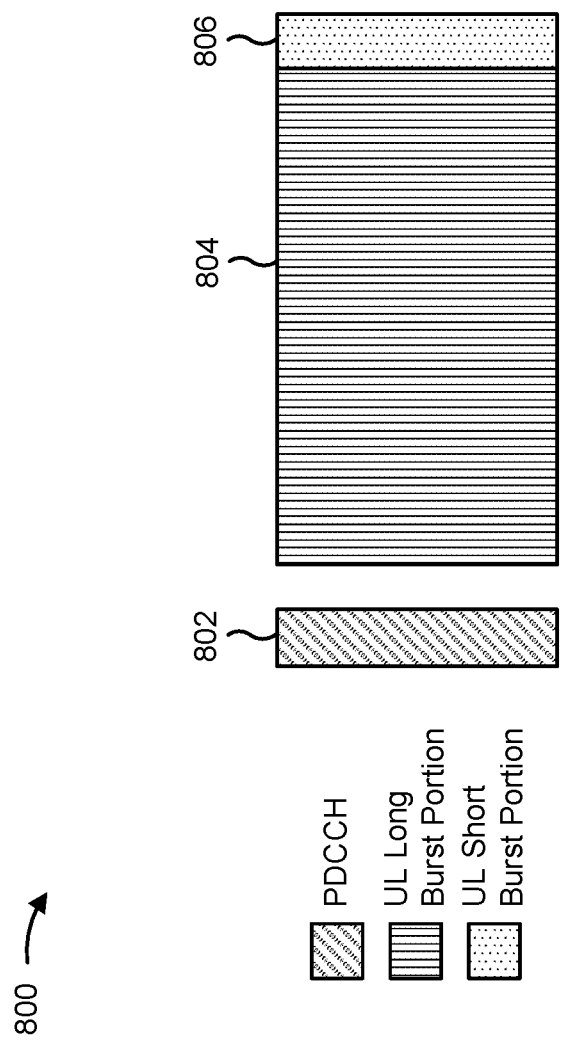
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided as an example. Other examples may differ from what is described with regard to FIG. 8.

5G wireless networks are designed to provide a high data rate and to support a wide scope of application scenarios. Wireless full-duplex communication is a technique intended to increase link capacity in 5G wireless networks and/or to reduce latency for time-critical services. Wireless full-duplex enables radio network nodes to transmit and receive simultaneously on the same frequency band and at the same time slot. This contrasts with conventional half-duplex operation where transmission and reception differ in either time or in frequency. In full-duplex communications, a node, such as a BS (e.g., BS 110), can communicate simultaneously in uplink and downlink directions with two half-duplex nodes using the same radio resources (e.g., the same frequency band and time slot). Another full-duplex scenario includes one relay node communicating simultaneously with an anchor node and a mobile node in a one-hop manner.

One issue with full-duplex communications is self-interference cancelation. In order for a radio network node to implement full-duplex communications, the node needs to be capable of canceling self-interference from simultaneous downlink and uplink communications. For example, uplink and downlink communications can co-exist at the same frequency and time resources at a BS with use of full-duplex (e.g., the BS can receive an uplink communication from a first UE at a same time and at a same frequency at which the BS is transmitting a downlink communication to a second UE). As another example, an integrated and backhaul (IAB) node, which functions as a relay node between an IAB donor and a UE, can receive backhaul downlink (low load) communications on the same time-frequency resources that the IAB node is using to transmit access downlink (high load) communications to the UE, or vice versa (e.g., the IAB node may receive low load access uplink communications from the UE on the same time-frequency resources that the IAB node is using to transmit high load backhaul uplink communications to the IAB donor). Some techniques for canceling self-interference use beamforming, analog cancelation, digital cancelation, and/or antenna cancelation to cancel self-interference.

In addition to the self-interference issue, in practice, different communications from and/or to different wireless nodes have different loads and/or urgencies. For example, in some scenarios, the communications associated with a BS may include downlink eMBB-related communications that are high loaded (and thus need to occupy all radio resources of a slot), and uplink URLLC-related communications that are low loaded but have a high urgency (and thus cannot wait until the downlink eMBB-related communications have been transmitted). As another example for IAB nodes, backhaul communications or access communications may be high loaded or have a high urgency depending on a direction of the communications, similar to that described with regard to eMBB-related and URLLC-related communications.

In these examples, some part of the radio resources within a slot need to be used for full-duplex communications, while other radio resources need not be used for full-duplex communications. When all radio resources of a slot are used for full-duplex, all of the uplink communications experience the same self-interference from the downlink communications. In this case, the BS can determine a proper transfer mode based on the expected self-interference, and the BS can utilize prior operations which are regulated for non-full-duplex communications. However, when a subset of the radio resources in a slot is used for full-duplex communications and another subset is used for, for example, only downlink communications, the self-interference may not occur until full-duplex is used. In this case, using prior operations creates a conflicting choice for the BS. If the transfer mode is determined based on the downlink-only radio resources, the reception performance will be degraded. Conversely, if the transfer mode is based on the radio resources used for full-duplex, the downlink communications become inefficient. Although techniques and operations are described herein in connection with slots, these techniques and operations can apply equally to other types of time durations or transmission time intervals (TTIs), such as a mini-slot, a subframe, a frame, a number of symbols, and/or the like.

Some techniques and apparatuses described herein provide for communicating multiple transport formats in a slot with full-duplex. For example, a BS may determine a first set of time-frequency resources in a slot to be used with full-duplex communications and another set of time-frequency resources in the slot to be used with non-full-duplex communications, where simultaneous transmission and reception are performed using the first set of time-frequency resources and either transmission or reception is performed on the second set of time-frequency resources. A transmit power from the BS may be different for the first set of time-frequency resources than for the second set of time-frequency resources. For example, the BS may transmit, to a wireless communication device, a first transport block modulated by a first transport format on the first set of time-frequency resources using a first transmit power and may transmit a second transport block modulated by a second transport format on the second set of time-frequency resources using a second transmit power.

In addition, some techniques and apparatuses described herein provide for signaling of an indication that identifies the sets of time-frequency resources, the transport formats, the transmit powers, and/or the like to the wireless communication device. This facilitates use of full-duplex and non-full-duplex (e.g., half-duplex) in a single slot, without degrading a performance of communications, without decreasing an efficiency of the communications, and/or the like.

In addition, utilizing different transmit powers reduces or eliminates self-interference that might occur at a BS that is using full-duplex communications, thereby improving use of full-duplex. Further, some techniques and apparatuses described herein reduce or eliminate a need to suspend on-going downlink communications for new uplink traffic by providing a way to perform the uplink transfer at any time during the on-going downlink transfer, or vice versa. Further, some techniques and apparatuses described herein maximize utilization of channel capacity (e.g., for eMBB services) while facilitating low latency (e.g., for URLLC services).

Further, some techniques and apparatuses described herein provide for a new design and/or use of downlink control information (DCI) with regard to implementing full-duplex communications. For example, some techniques and apparatuses described herein provide for use of a single transmission of DCI or multiple linked transmissions of DCI for indicating information related to use of full-duplex communications (e.g., where previous DCI designs and/or uses were capable of only indicating one time-frequency resource position and one transport format). Use of a single transmission of DCI to indicate multiple time-frequency resources and corresponding transport formats, for example, may reduce radio resource consumption relative to using multiple linked transmissions of DCI. Use of multiple linked transmissions of DCI may reduce or eliminate blind decoding that the UE would otherwise have to perform if using multiple unlinked transmissions of DCI. For example, the multiple linked transmissions may indicate an existence and/or a slot position of each other, which reduces a need for blind decoding by a wireless communication device that receives the multiple transmissions, such as when there is no full-duplex/non-full-duplex coexistence in a slot.

Figure 9:
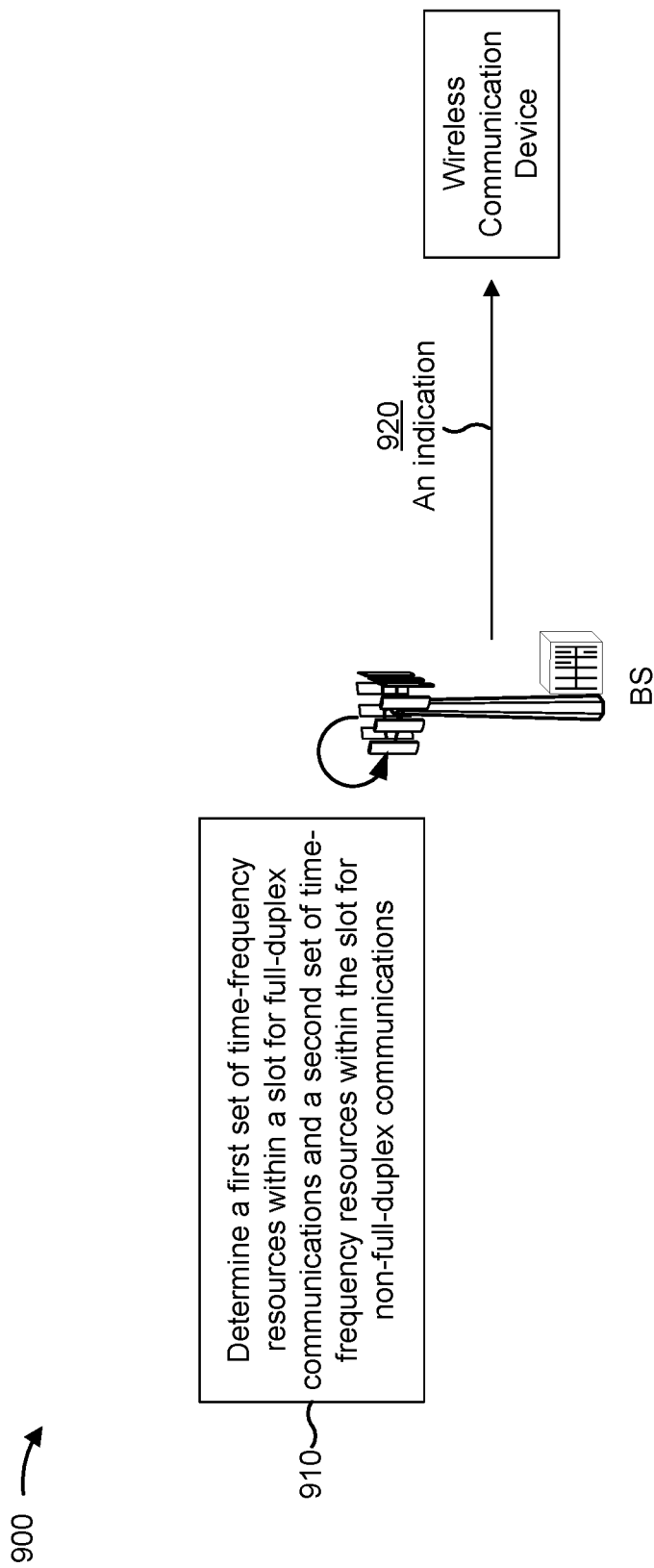
FIGS. 9-14C are diagrams illustrating one or more examples related to communicating multiple transport formats in a slot with full-duplex, in accordance with various aspects of the present disclosure.

FIG. 9 is a diagram illustrating an example 900 related to communicating multiple transport formats in a slot with full-duplex, in accordance with various aspects of the present disclosure. As shown in FIG. 9, example 900 includes a BS (e.g., BS 110) and a wireless communication device (e.g., another BS 110, UE 120, and/or the like).

As shown in FIG. 9, and by reference number 910, the BS may determine a first set of time-frequency resources within a slot for full-duplex communications and a second set of time-frequency resources within the slot for non-full-duplex communications. For example, the BS may determine the first set of time-frequency resources and the second set of time-frequency resources based at least in part on having data to transmit to the wireless communication device. The first set of time-frequency resources may be intended for simultaneous transmission and reception, and the second set of time-frequency resources may be intended for one of transmission and reception.

For a slot, the BS may determine one of a variety of configurations of the first set of time-frequency resources and the second set of time-frequency resources. In some aspects, the first set of time-frequency resources and the second set of time-frequency resources may occupy fully overlapping frequency domain resources (e.g., may occupy overlapping physical resource blocks (PRBs) or bandwidth parts (BWPs)) and may occupy non-overlapping time domain resources (e.g., may occupy different OFDM symbols), as described below in connection with FIG. 10A. Additionally, or alternatively, the first set of time-frequency resources and the second set of time-frequency resources may occupy fully overlapping time domain resources (e.g., may occupy overlapping OFDM symbols) and may occupy non-overlapping frequency domain resources (e.g., may occupy different PRBs or BWPs), as described below in connection with FIG. 10B. Additionally, or alternatively, the first set of time-frequency resources and the second set of time-frequency resources occupy partially overlapping time domain resources (e.g., may occupy partially overlapping OFDM symbols) and partially overlapping frequency domain resources (e.g., may occupy partially overlapping PRBs or BWPs), as described below in connection with FIG. 10C.

In some aspects, different transmit powers are to be used for the first set of time-frequency resources and the second set of time-frequency resources. For example, the first set of time-frequency resources may have a lower transmit power relative to the second set of time-frequency resources. This may reduce or eliminate self-interference that would otherwise occur at the BS due to simultaneous transmission and reception.

The BS may transmit, to the wireless communication device, a first demodulation reference signal (DMRS) for the first set of time-frequency resources and a second DMRS for the second set of time-frequency resources based at least in part on determining the first set of time-frequency resources and the second set of time-frequency resources. A transmit power of the first DMRS may be associated with a transmit power of the first set of time-frequency resources, and a transmit power of the second DMRS may be associated with a transmit power of the second set of time-frequency resources. In this case, the BS may determine a transmit power for the first set of time-frequency resources based at least in part on the transmit power of the first DMRS and may determine a transmit power for the second set of time-frequency resources based at least in part on the transmit power of the second DMRS.

The BS may transmit, to the wireless communication device, a single demodulation reference signal (DMRS) for the second set of time-frequency resources based at least in part on determining the first set of time-frequency resources and the second set of time-frequency resources, and may transmit, based at least in part on transmitting the single DMRS, an indication of the different transmit powers. In this case, the different transmit powers may be based at least in part on a difference between the different transmit powers of the first set of time-frequency resources and the second set of time-frequency resources (e.g., a preconfigured difference, a static difference, a dynamic difference, and/or the like).

The BS may determine different transport formats (e.g., MCS values) for corresponding transport blocks of the first set of time-frequency resources and the second set of time-frequency resources within a PDSCH. For example, the BS may determine a first MCS to be used for the first set of time-frequency resources and a second MCS to be used for the second set of time-frequency resources.

With regard to transmit powers and transport formats, the BS may determine the transmit powers and the transport formats in different scenarios. For example, in a first scenario where the BS is to transmit a PDSCH communication to a UE in a cell where part of the PDSCH communication overlaps with uplink traffic (e.g., a PUCCH communication or a PUSCH communication) of another UE on the first set of time-frequency resources, the BS may decrease transmit power in the downlink direction on the first set of time-frequency resources. Continuing with the previous example, the BS may determine corresponding MCS values for two transport blocks corresponding to the first set of time-frequency resources and the second set of time-frequency resources prior to transmitting the PDSCH communication. Continuing still with the previous example, the BS may transmit an indication of the corresponding MCS values to the UE, and the UE may demodulate and/or decode the two transport blocks, as described elsewhere herein.

Additionally, or alternatively, and as another example for a second scenario where an IAB node (e.g., a first BS) is to transmit a PDSCH communication to a UE, where part of the PDSCH communication overlaps with simultaneous backhaul link downlink traffic from an IAB donor (e.g., a second BS) on the first set of time-frequency resources, the IAB node may decrease transmit power on the first set of time-frequency resources for an access downlink communication to the UE. Continuing with the previous example, the IAB node may determine corresponding MCS values for two transport blocks corresponding to the first set of time-frequency resources and the second set of time-frequency resources prior to transmitting the access downlink communication. Continuing still with the previous example, the IAB node may transmit an indication of the corresponding MCS values to the UE and the UE may demodulate and decode the two transport blocks.

Additionally, or alternatively, and as another example for a third scenario where an IAB node (e.g., a first BS) is to transmit a backhaul uplink communication to an IAB donor (e.g., a second BS) where part of the backhaul communication overlaps with a simultaneous access link uplink communication from a UE on the first set of time-frequency resources, the IAB node may decrease transmit power on the first set of time-frequency resources for the backhaul uplink communication. Continuing with the previous example, the IAB node may determine corresponding MCS values for two transport blocks corresponding to the first set of time-frequency resources and the second set of time-frequency resources prior to transmitting the backhaul uplink communication. Continuing still with the previous example, the IAB node may transmit an indication of the corresponding MCS values to the IAB donor and the IAB donor may demodulate and decode the two transport blocks.

As further shown in FIG. 9, and by reference number 920, the BS may transmit, and the wireless communication device may receive, an indication of the first set of time-frequency resources, the second set of time-frequency resources, and corresponding transport formats for the first set of time-frequency resources and the second set of time-frequency resources. For example, the BS may transmit the indication after determining the first set of time-frequency resources and the second set of time-frequency resources, after determining the transmit powers, after determining the transport formats, and/or the like.

In some aspects, the indication may include a high-layer signal that identifies corresponding positions in the slot for the first set of time-frequency resources and the second set of time-frequency resources. For example, the indication may include an RRC signal that identifies positions of time-frequency resources included in the first set of time-frequency resources and the second set of time-frequency resources. Additionally, or alternatively, the indication may include a high-layer signal that identifies possible slot partition patterns for the first set of time-frequency resources and the second set of time-frequency resources. For example, the indication may include a list of possible slot partition patterns, any of which may be used for a slot. In this case, the BS may indicate a particular slot partition pattern, of the possible slot partition patterns, using a media access control control element (MAC CE) separate from the indication. For example, the MAC CE may identify which of the possible slot partition patterns is to be used for a slot. Additionally, or alternatively, the indication may include slot-specific signaling that identifies the corresponding positions in the slot for the first set of time-frequency resources and the second set of time-frequency resources. For example, the BS may use DCI in a PDCCH communication to indicate the corresponding positions of the first set of time-frequency resources and the second set of time-frequency resources in a slot. In this case, the configuration of positions is performed on a slot-by-slot basis, thereby providing increased flexibility relative to other described indications.

The indication may identify corresponding MCS values for two transport blocks corresponding to different sets of time-frequency resources. For example, the indication may indicate corresponding MCS values for two transport blocks corresponding to the first set of time-frequency resources and the second set of time-frequency resources and may be included in DCI.

The indication may include DCI. For example, the indication may include DCI in a PDCCH communication. Various size options are possible for the DCI. As a first example, a size of the DCI may facilitate one or more indications related to one transport block associated with the first set of time-frequency resources and another transport block associated with the second set of time-frequency resources. This option maintains a size of the DCI currently used in NR regardless of whether one or two transport formats are indicated to the wireless communication device. As such, only one transport block can be transmitted on the first set of time-frequency resources and one transport block can be transmitted on the second set of time-frequency resources. In the case where multiple spatial layers are used, the multiple spatial layers can be mapped into a single transport block.

As a second example, a size of the DCI may facilitate one or more indications related to the corresponding transport formats and to multiple corresponding transport blocks for the first set of time-frequency resources and the second set of time-frequency resources. This option utilizes a new DCI size from current NR DCI, and the wireless communication device may need to perform additional blind detection of the new DCI size as well as for the current NR DCI size in a slot. Alternatively, the BS may transmit an indication to the wireless communication device that the BS is to use the new DCI size prior to using the new DCI size, thereby eliminating a need for the wireless communication device to perform blind decoding for the current NR DCI size, thereby conserving computing resources of the wireless communication device.

The DCI may be a single transmission of DCI. For example, a single transmission of DCI may indicate positions in a slot for the first set of time-frequency resources and the second set of time-frequency resources and may indicate corresponding transport formats for the first set of time-frequency resources and the second set of time-frequency resources. Alternatively, the DCI may be multiple transmissions of linked DCI. For example, the DCI may be two transmissions of linked DCI where one of the two transmissions indicates a position in a slot for the first set of time-frequency resources and a first transport format for the first set of time-frequency resources, and the other of the two transmissions indicates a position in a slot for the second set of time-frequency resources and a second transport format for the second set of time-frequency resources. In addition, one transmission may include an indication of the existence and/or a position in a slot of the other transmission, and the wireless communication device may attempt to detect another transmission of DCI after receiving the transmission that includes the indication.

When the DCI includes two transmissions of linked DCI, the two transmissions may be in a same control resource set (CORESET). For example, the two transmissions may be in a same CORESET prior to a position in the slot of both of the first set of time-frequency resources and the second set of time-frequency resources. In this case, extra bits in the DCI may be used to indicate multiple transport formats. Alternatively, the two transmissions of linked DCI may be in different CORESETs. For example, one transmission of linked DCI may be in a first CORESET prior to one of the first set of time-frequency resources and the second set of time-frequency resources, and another transmission may be in a second CORESET after the one of the first set of time-frequency resources and the second set of time-frequency resources and prior to the other of the first set of time-frequency resources and the second set of time-frequency resources. In this case, extra bits in one transmission of DCI can be used to indicate a position of the CORESET that includes the other transmission of DCI, thereby linking the two transmissions of DCI and forming two transmissions of linked DCI.

The DCI may indicate use of a partitioning pattern for time-frequency resources of a slot (e.g., which time-frequency resources are included in the first set of time-frequency resources and which time-frequency resources are included in the second set of time-frequency resources). In some aspects, the DCI may indicate use of time domain multiplexing for the first set of time-frequency resources and the second set of time-frequency resources (time domain multiplexing is described in connection with FIG. 10A). For example, when the DCI is a single transmission of DCI, a field in the DCI may indicate a total set of time resources associated with the first set of time-frequency resources and the second set of time-frequency resources (e.g., the field may identify all used downlink OFDM symbols for the first set of time-frequency resources and the second set of time-frequency resources). The field may include information that identifies the start position and the length of a set of continuous time resources, or start and end positions of the set of continuous time resources for the first set of time-frequency resources and the second set of time-frequency resources. Continuing still with the previous example, the single transmission of DCI may include a bitmap (e.g., with a size equal to the quantity of OFDM symbols in a slot) that identifies which time resources of the total set of time resources are associated with the first set of time-frequency resources and which other time resources of the total set of time resources are associated with the second set of time-frequency resources. This configuration of DCI can support arbitrary patterns of time resources (e.g., discontinuous durations, which may occur when a PDSCH communication collides with more than one PUSCH communication in different symbols).

Alternatively, wherein the DCI indicates the use of time domain multiplexing via the single transmission of DCI, various fields in the DCI may identify partitioning of time resources of a slot for the first set of time-frequency resources and the second set of time-frequency resources. For example, a first field in the DCI may indicate a total set of time resources associated with the first set of time-frequency resources and the second set of time-frequency resources, and a second field in the DCI may indicate particular time resources associated with the first set of time-frequency resources or the second set of time-frequency resources. This configuration of DCI has a smaller overhead relative to the previous described configuration, but supports fewer patterns of time-frequency resources.

When the DCI used to indicate use of the time domain multiplexing includes multiple (e.g., two) transmissions of linked DCI, a first transmission may indicate time resources of one of the first set of time-frequency resources and the second set of time-frequency resources, and may indicate a first transport format for the one of the first set of time-frequency resources and the second set of time-frequency resources. The second transmission may indicate other time resources of the other of the first set of time-frequency resources and the second set of time-frequency resources, and may indicate a second transport format for the other of the first set of time-frequency resources and the second set of time-frequency resources. The wireless communication device may detect the second transmission based at least in part on successful detection of the first transmission.

Additionally, or alternatively, the DCI may indicate use of frequency domain multiplexing for the first set of time-frequency resources and the second set of time-frequency resources (frequency domain multiplexing is described in connection with FIG. 10B). For example, when the DCI is a single transmission of DCI, a field in the DCI may indicate a total set of frequency resources associated with the first set of time-frequency resources and the second set of time-frequency resources (e.g., the field may identify all used downlink PRBs, sub-bands, or BWPs for the first set of time-frequency resources and the second set of time-frequency resources). The field may include information that identifies the start position and the length of a set of continuous frequency resources, or start and end positions of the set of continuous frequency resources, for the first set of time-frequency resources and the second set of time-frequency resources. Continuing still with the previous example, the single transmission of DCI may include a bitmap (e.g., with a size equal to the quantity of PRBs, sub-bands, or BWPs in a slot) that identifies which frequency resources of the total set of frequency resources are associated with the first set of time-frequency resources and which other frequency resources of the total set of frequency resources are associated with the second set of time-frequency resources.

Alternatively, when the DCI indicates the use of frequency domain multiplexing via the single transmission of DCI, various fields in the DCI may identify partitioning of frequency resources of a slot for the first set of time-frequency resources and the second set of time-frequency resources. For example, a first field in the DCI may indicate a total set of frequency resources associated with the first set of time-frequency resources and the second set of time-frequency resources, and a second field in the DCI may indicate particular frequency resources associated with the first set of time-frequency resources or the second set of time-frequency resources.

When the DCI used to indicate use of the frequency domain multiplexing includes multiple (e.g., two) transmissions of linked DCI, a first transmission may indicate frequency resources of one of the first set of time-frequency resources and the second set of time-frequency resources, and may indicate a first transport format for the one of the first set of time-frequency resources and the second set of time-frequency resources. The second transmission may indicate other frequency resources of the other of the first set of time-frequency resources and the second set of time-frequency resources, and may indicate a second transport format for the other of the first set of time-frequency resources and the second set of time-frequency resources. The wireless communication device may detect the second transmission based at least in part on successful detection of the first transmission.

Additionally, or alternatively, the DCI may indicate use of a combination of time domain multiplexing and frequency domain multiplexing for the first set of time-frequency resources and the second set of time-frequency resources (the combination is described in connection with FIG. 10C). For example, when the DCI is a single transmission of DCI, corresponding fields in the DCI may indicate a total set of time resources and frequency resources associated with the first set of time-frequency resources and the second set of time-frequency resources (e.g., a first field may identify all used downlink PRBs, sub-bands, or BWPs for the first set of time-frequency resources and the second set of time-frequency resources, and a second field may identify all used downlink OFDM symbols for the first set of time-frequency resources and the second set of time-frequency resources). The fields may include information that identifies the start position and the length of a set of resources, or start and end positions of the set of continuous resources, for the first set of time-frequency resources and the second set of time-frequency resources. Continuing still with the previous example, the single transmission of DCI may include a bitmap that identifies which time-frequency resources of the total set of time resources and frequency resources are associated with the first set of time-frequency resources and which other time-frequency resources of the total set of time resources and frequency resources are associated with the second set of time-frequency resources.

Alternatively, when the DCI indicates the use of the combination of time domain multiplexing and frequency domain multiplexing via the single transmission of DCI, various fields in the DCI may identify partitioning of time-frequency resources of a slot for the first set of time-frequency resources and the second set of time-frequency resources. For example, a first combination of fields (e.g., a combination of a first field associated with time resources and a second field associated with frequency resources) in the DCI may indicate a total set of time resources and frequency resources associated with the first set of time-frequency resources and the second set of time-frequency resources, and a second combination of fields in the DCI may indicate particular time resources and frequency resources associated with the first set of time-frequency resources or the second set of time-frequency resources.

When the DCI used to indicate use of the combination of time domain multiplexing and frequency domain multiplexing includes multiple (e.g., two) transmissions of linked DCI, a first transmission may indicate time resources and frequency resources of one of the first set of time-frequency resources and the second set of time-frequency resources, and may indicate a first transport format for the one of the first set of time-frequency resources and the second set of time-frequency resources. The second transmission may indicate other time resources and frequency resources of the other of the first set of time-frequency resources and the second set of time-frequency resources, and may indicate a second transport format for the other of the first set of time-frequency resources and the second set of time-frequency resources.

The BS may transmit corresponding transport blocks on the first set of time-frequency resources and the second set of time-frequency resources after transmitting the indication. For example, the BS may transmit the corresponding transport blocks to the wireless communication device for decoding and demodulation. Continuing with the previous example, the corresponding transport blocks may be modulated by different transport formats (e.g., different MCS values).

As indicated above, FIG. 9 is provided as an example. Other examples may differ from what is described with respect to FIG. 9.

Figure 10A:
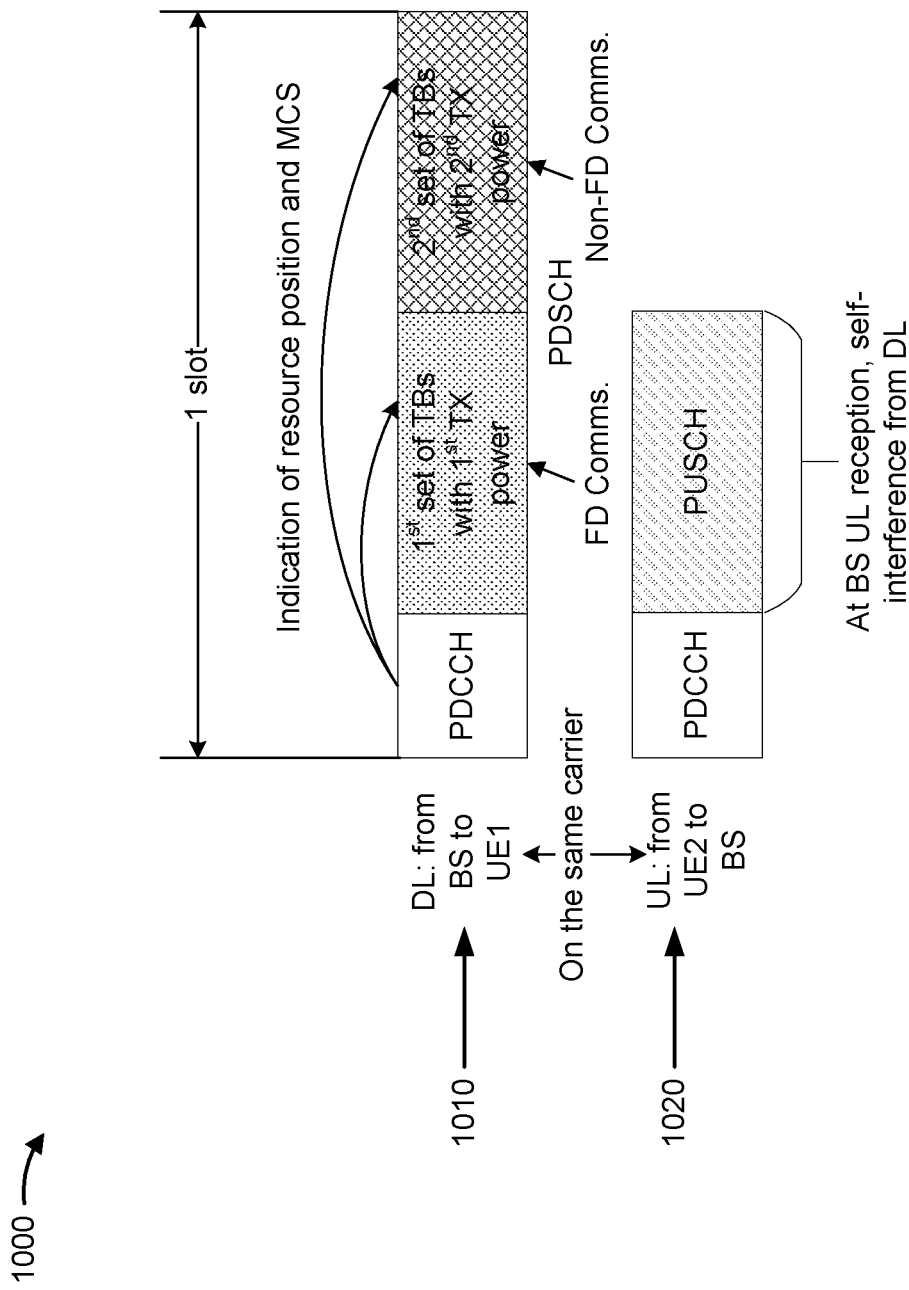
Figure 10B:
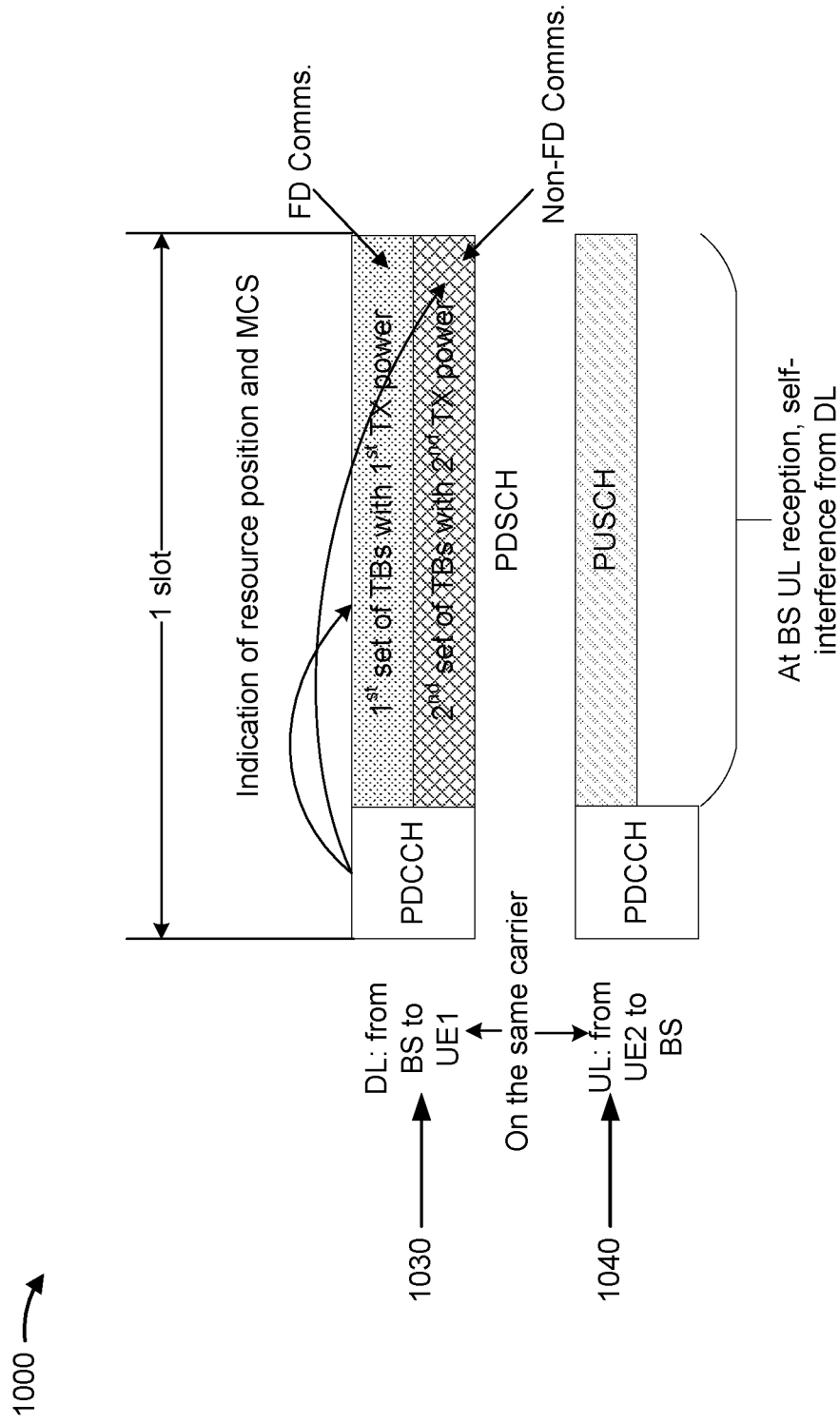
Figure 10C:
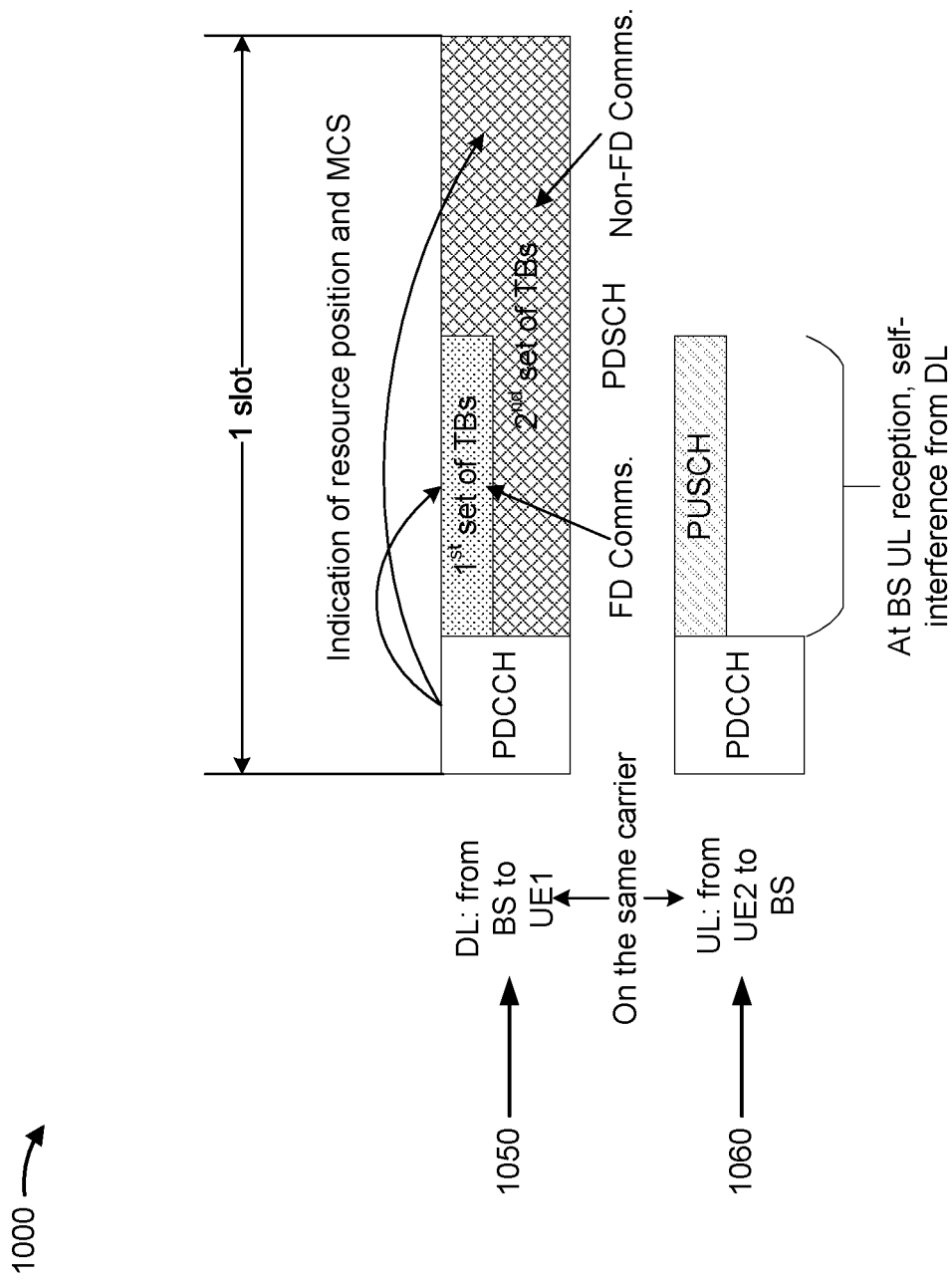

FIGS. 10A-10C are diagrams illustrating one or more examples 1000 related to communicating multiple transport formats in a slot with full-duplex, in accordance with various aspects of the present disclosure. For example, FIGS. 10A-10C show various example patterns of full-duplex communications and non-full-duplex communications within a slot.

As shown in FIG. 10A, and by reference number 1010, a first example pattern may be associated with downlink (DL) communications from a BS to a UE1 in a slot. In this pattern, one or more symbols of the slot may be reserved for PDCCH communications (shown as "PDCCH"). The PDCCH communications may include an indication of respective resource positions and MCSs for the full-duplex communications (identified by "FD Comms." and shown as a dotted pattern box) and the non-full-duplex communications (identified by "Non-FD Comms." and shown as a thatched pattern box) that are to occupy subsequent symbols of the slot. As further shown in FIG. 10A, the remaining symbols of the slot may be divided across the full-duplex communications and the non-full-duplex communications. For example, half of the remaining symbols may be reserved for a first set of transport blocks transmitted at a first transmit (TX) power for the full-duplex communications (shown by the dotted pattern), and the other half of the remaining symbols may be reserved for a second set of transport blocks transmitted at a second TX power for the non-full-duplex communications (shown by the thatched pattern). The full-duplex communications and the non-full-duplex communications may be included in PDSCH communications from the BS.

As shown by reference number 1020, the downlink communications may overlap with uplink (UL) communications from a UE2 to the BS on a same carrier as the downlink communications. For example, the full-duplex communications may overlap with PUSCH communications from the UE2. Overlap of the full-duplex communications and the full-duplex communications may cause self-interference at the BS. As described elsewhere herein, the different TX powers used for the full-duplex communications and the non-full-duplex communications may reduce or eliminate occurrence of the self-interference. In this way, the first pattern includes full-duplex communications and non-full-duplex communications that occupy fully overlapping frequency domain resources (e.g., that occupy the same PRBs or BWPs) and occupy non-overlapping time domain resource (e.g., different OFDM symbols).

FIG. 10B shows a second example pattern of full-duplex communications and non-full-duplex communications within a slot. For example, FIG. 10B shows a second pattern of full-duplex communications and non-full-duplex communications within a slot for downlink communications from a BS to a UE1. As shown by reference number 1030, one or more symbols of the slot may be reserved for PDCCH communications in a manner similar to that described above. As further shown by reference number 1030, the full-duplex communications and the non-full-duplex communications may each occupy the remaining symbols of the slot, but at different frequencies. As shown by reference number 1040, PUSCH communications from a UE2 may overlap with the full-duplex communications and may cause self-interference at the BS, similar to that described above. As described elsewhere herein, the different TX powers used for the full-duplex communications and the non-full-duplex communications may reduce or eliminate occurrence of the self-interference. In this way, the full-duplex communications and the non-full-duplex communications may occupy fully overlapping time domain resources (e.g., the same OFDM symbols) and may occupy non-overlapping frequency domain resources (e.g., different PRBs or BWPs).

FIG. 10C shows a third example pattern of full-duplex communications and non-full-duplex communications within a slot. For example, FIG. 10C shows a third pattern of full-duplex communications and non-full-duplex communications within a slot for downlink communications from a BS to a UE1. As shown by reference number 1050, the full-duplex communications and the non-full-duplex communications may occupy a combination of different frequencies on the same time resources and different time resources on the same frequency resources. As shown by reference umber 1060, the full-duplex communications may overlap with uplink PUSCH communications from a UE2 to the BS, which may cause self-interference similar to that described above. The full-duplex communications and the non-full-duplex communications may have different transmit powers, which may reduce or eliminate occurrence of the self-interference. In this way, full-duplex communications and non-full-duplex communications may occupy partially overlapping time and frequency domain resources.

As indicated above, FIGS. 10A-10C are provided as one or more examples. Other examples may differ from what is described with respect to FIGS. 10A-10C.

Figure 11A:
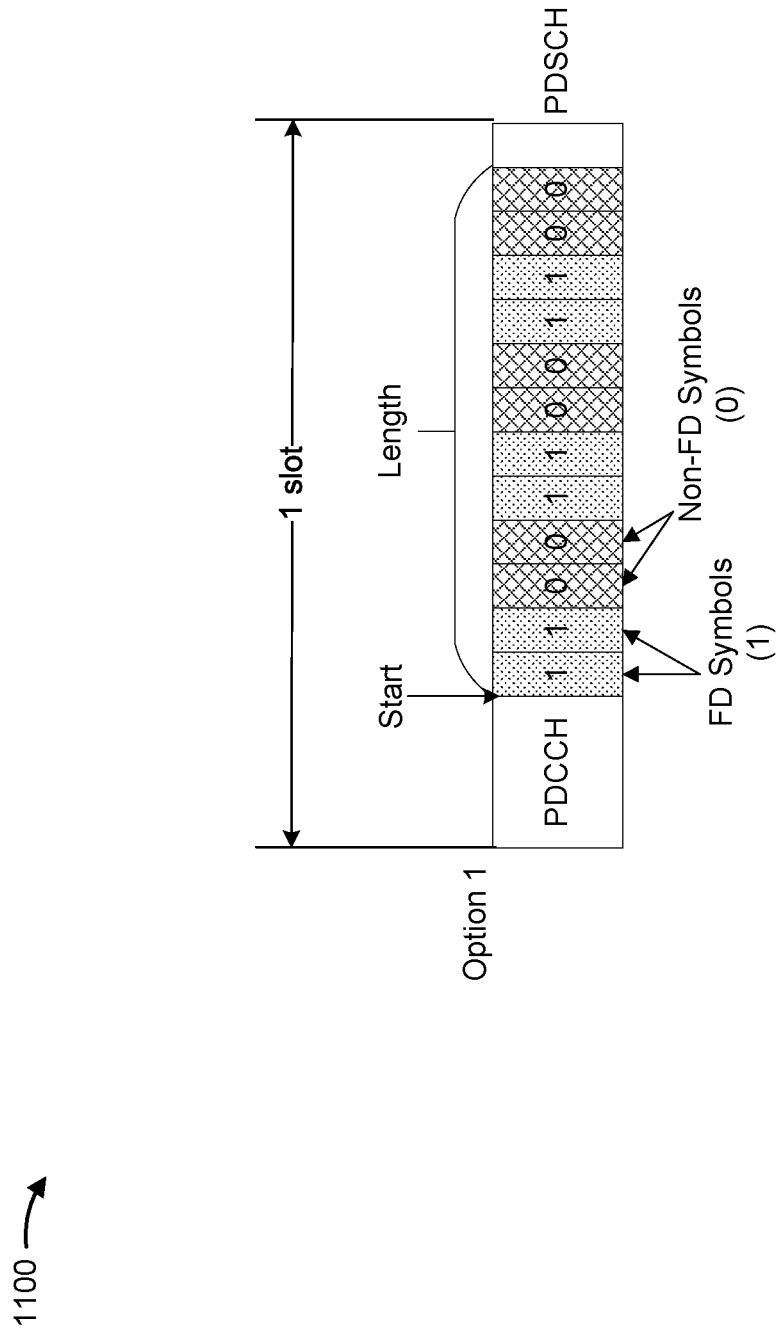

FIGS. 11A and 11B are diagrams illustrating one or more examples 1100 related to communicating multiple transport formats in a slot with full-duplex, in accordance with various aspects of the present disclosure. For example, FIGS. 11A and 11B show various patterns of full-duplex communications and non-full-duplex communications that can be indicated by a single transmission of DCI. FIG. 11A shows a first example option ("Option 1") for the first example pattern shown in FIG. 10A that can be indicated via a single transmission of DCI. In this case, downlink symbols of a slot are identified via a field in the transmission of DCI, and a bitmap is used to identify whether each identified symbol is a full-duplex symbol for full-duplex communications or a non-full-duplex symbol for non-full-duplex communications. The first example pattern shown in FIG. 11A shows alternating pairs of full-duplex symbols, labeled with "1" and shown by the dotted patterns, and non-full-duplex symbols, labeled with "0" and shown by the thatched patterns.

FIG. 11B shows various example configurations for a second example option ("Option 2") for the first example pattern shown in FIG. 10B. For example, the various configuration may be capable of being indicated by a single transmission of DCI. Reference number 1110 shows a first example configuration for the second example option that can be indicated by a single transmission of DCI. For example, a field in the single transmission of DCI may indicate a total quantity of time resources to be used for full-duplex communications and non-full-duplex communications (e.g., shown by "Start 1" and "Length 1") and another field in the single transmission of DCI may indicate which time resources are used for the full-duplex communications (e.g., shown by "Start 2" and "Length 2"). In the first configuration shown by reference number 1110, the slot includes non-full-duplex communications at both ends of the full-duplex communications.

Reference number 1120 shows a second example configuration for the second example option that can be indicated by a single transmission of DCI. The second example configuration can be indicated in a manner similar to that described for the first example configuration described with respect to reference number 1110, except that the slot includes full-duplex communications at both ends of the non-full-duplex communications.

As indicated above, FIGS. 11A and 11B are provided as one or more examples. Other examples may differ from what is described with respect to FIGS. 11A and 11B. Although FIGS. 11A and 11B were described in the context of the first example pattern shown in FIG. 10A, the aspects equally apply to the second example pattern shown in FIG. 10B and the third example pattern shown in FIG. 10C.

Figure 12:
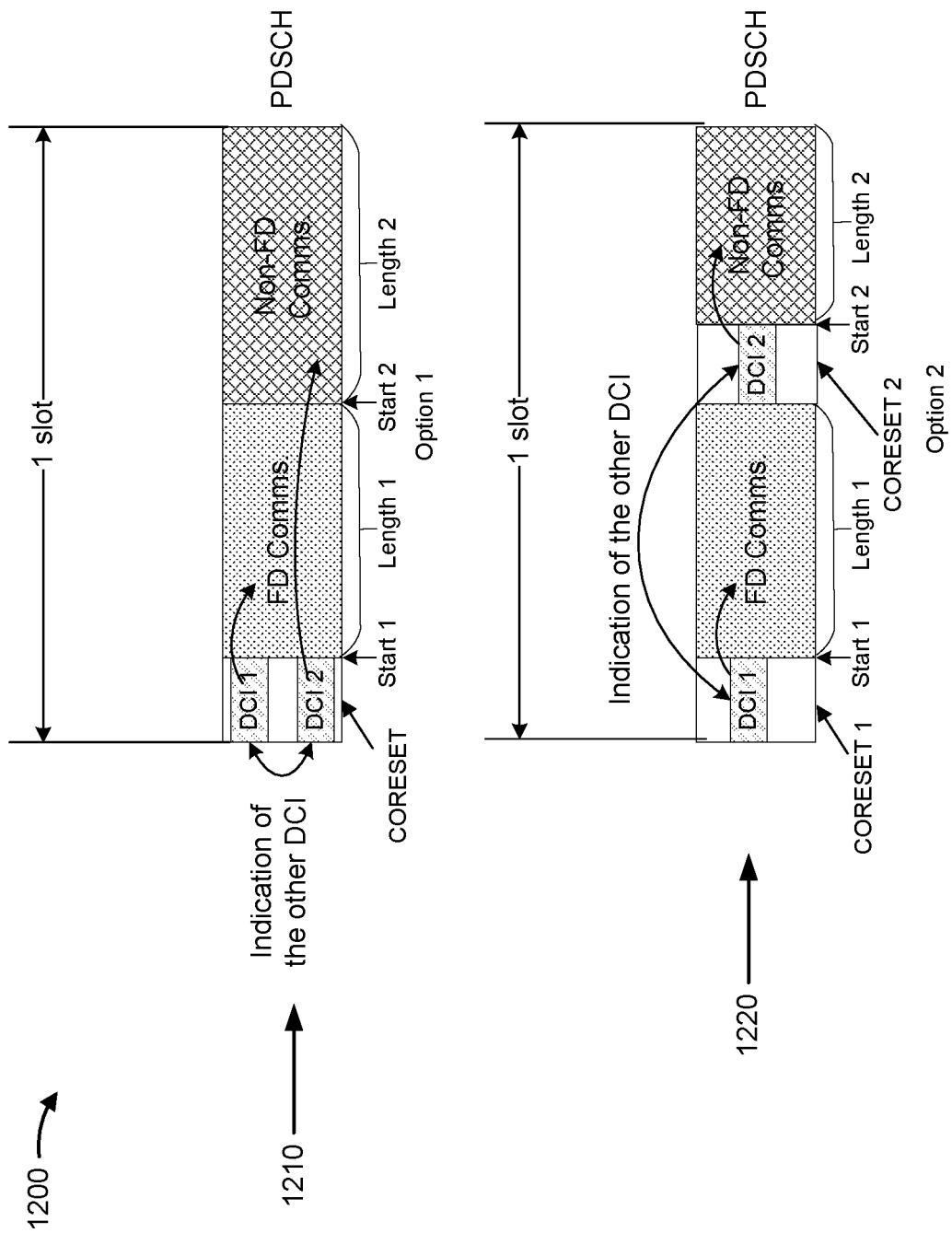

FIG. 12 is a diagram illustrating an example 1200 related to communicating multiple transport formats in a slot with full-duplex, in accordance with various aspects of the present disclosure. For example, FIG. 12 shows use of two transmissions of linked DCI to indicate a slot partition pattern for full-duplex communications and non-full-duplex communications. As shown by reference number 1210, the two transmissions of linked DCI may be in the same CORESET. A first transmission of DCI ("DCI 1") may indicate a positioning of the full-duplex communications within the slot (e.g., by indicating a start position ("Start 1") and a length ("Length 1") of the full-duplex communications) and a second transmission of DCI ("DCI 2") may indicate a positioning of the non-full-duplex communications within the slot (e.g., by indicating a start position and length for the non-full-duplex communications). In addition, the two transmissions of linked DCI may each indicate an existence and/or a slot position of the other transmission. For example, the first transmission of DCI may indicate the presence of the second transmission of DCI and may indicate that the second transmission is in the same CORESET as the first transmission.

As shown by reference number 1220, the two transmissions of linked DCI may be in different CORESETs. For example, a first transmission of DCI may be in a first CORESET ("CORESET 1") to indicate a start and length of full-duplex communications, and a second transmission of DCI may be in another CORESET ("CORESET 2"), after the symbols occupied by the full-duplex communications, to indicate a start and length of non-full-duplex communications. In addition, the first transmission and the second transmission may indicate an existence and/or a position within the slot for each other in a manner similar to that described above.

As indicated above, FIG. 12 is provided as an example. Other examples may differ from what is described with respect to FIG. 12.

Figure 13:
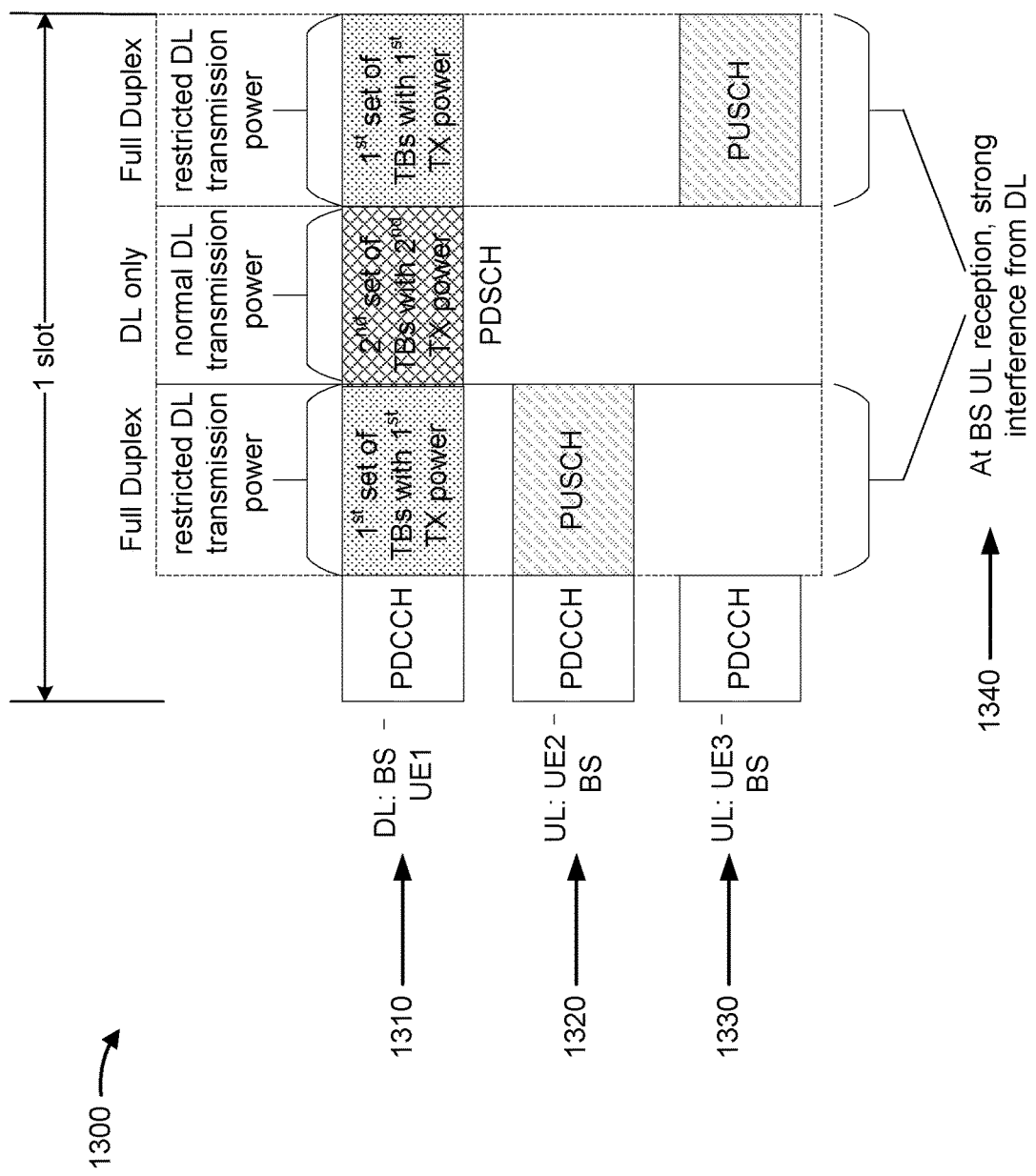

FIG. 13 is a diagram illustrating an example 1300 related to communicating multiple transport formats in a slot with full-duplex, in accordance with various aspects of the present disclosure. For example, FIG. 13 shows an example of use of full-duplex communications and non-full-duplex communications between a BS and multiple UEs.

As shown by reference number 1310, the BS may transmit downlink communications to a UE1 in a slot. The downlink communications may include a first set of transport blocks for full-duplex communications with a first transmit power, which is reduced from a normal transmit power used for downlink communications. In addition, the downlink communications may include a second set of transport blocks with a second transmit power (e.g., a normal un-restricted transmit power) for the non-full-duplex communications. In the pattern of communications shown with respect to reference number 1310, the full-duplex communications may include different subsets of downlink communications corresponding to uplink communications from multiple UEs, as described below.

As shown by reference umber 1320, the BS may receive uplink communications from a UE2 on the same carrier as a first subset of the downlink communications from the BS to the UE1. The UE2 may transmit the uplink communications at a different power level than the first subset of the downlink communications. As shown by reference number 1330, the BS may receive other uplink communications from a UE3 on the same carrier as a second subset of the downlink communications from the BS to the UE1. The UE3 may transmit the uplink communications at a different power level than the second subset of the downlink communications and at different symbols than the uplink communications from the UE2. As shown by reference number 1340, the downlink communications from the BS would ordinarily cause interference with the uplink communications from UE2 and UE3. However, the different transmit powers used for corresponding subsets of the downlink communications on the same carriers as the uplink communications may reduce or eliminate this interference.

As indicated above, FIG. 13 is provided as an example. Other examples may differ from what is described with respect to FIG. 13.

Figure 14A:
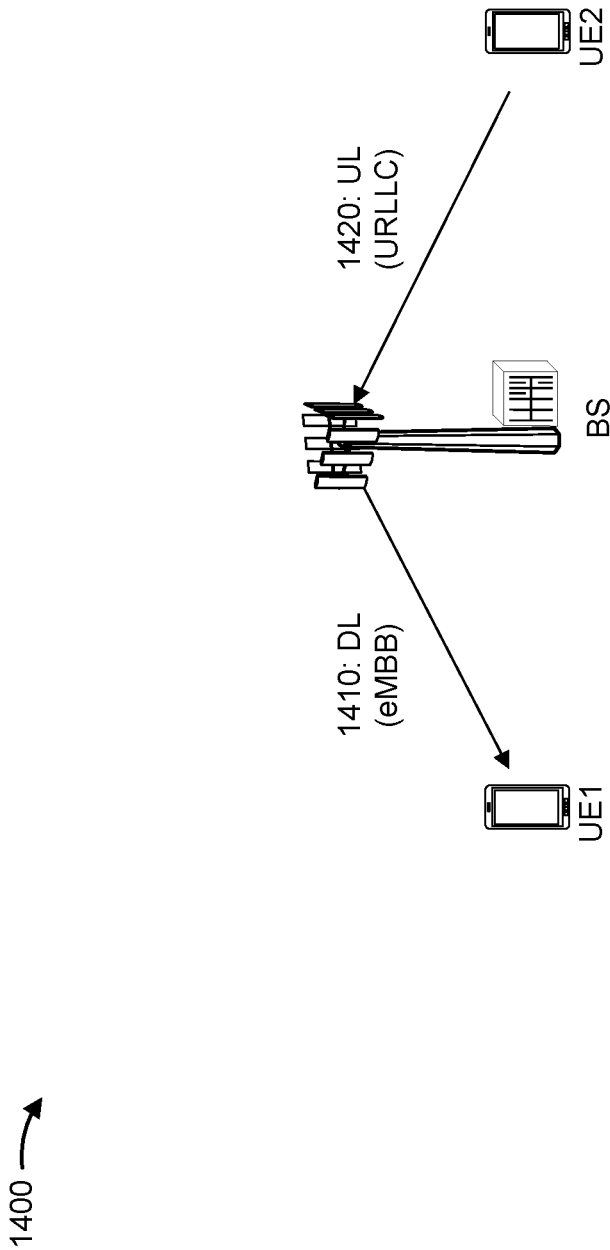
Figure 14B:
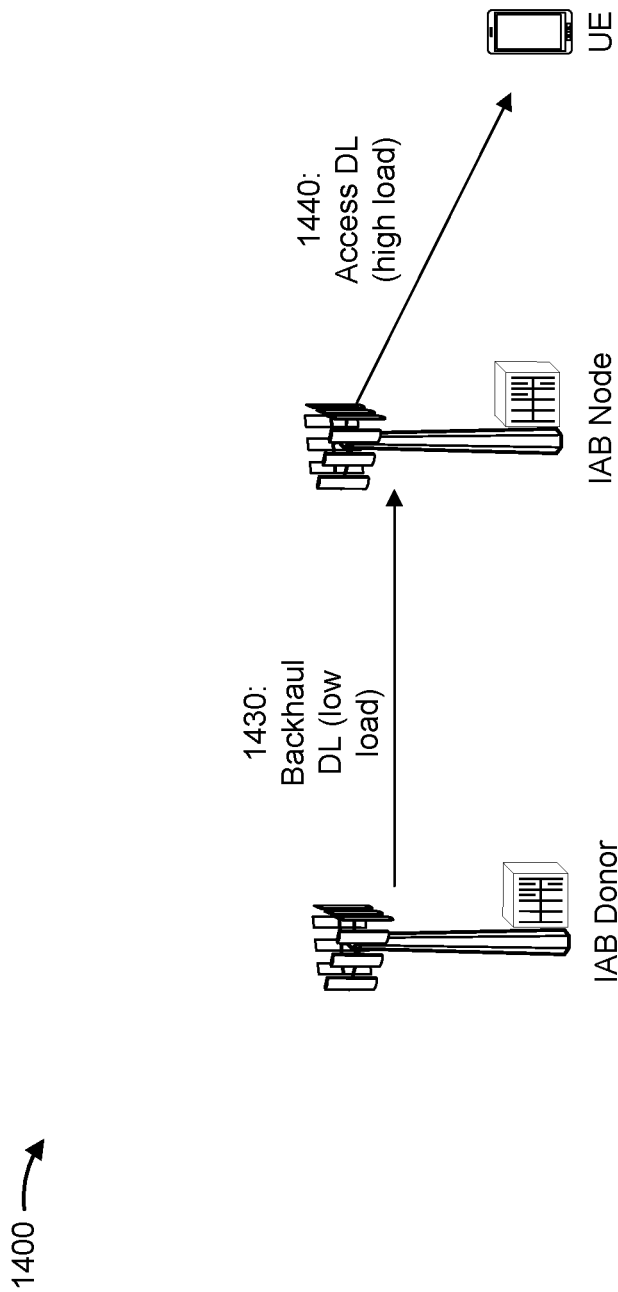
Figure 14C:
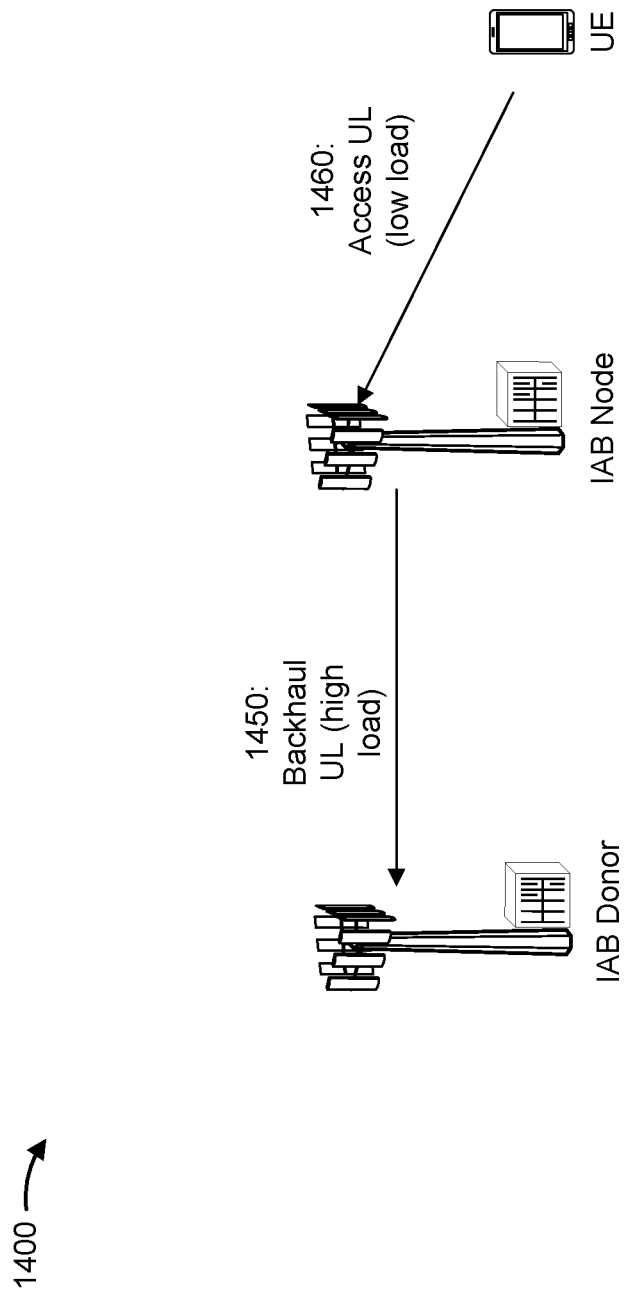

FIGS. 14A-14C are diagrams illustrating one or more examples 1000 related to communicating multiple transport formats in a slot with full-duplex, in accordance with various aspects of the present disclosure. For example, FIGS. 14A-14C show various example deployment scenarios in which some aspects described herein may be implemented.

FIG. 14A shows a first example deployment scenario in which some aspects described herein may be implemented. In this first example scenario, uplink (UL) and downlink (DL) communications between a BS (e.g., BS 110) and multiple UEs (e.g., UEs 120) may be full-duplex communications. For example, and as shown by reference number 1410, the BS may transmit DL (eMBB) communications to a UE1. As shown by reference number 1420, the BS may receive UL (URLLC) communications from a UE2 on a same carrier on which the BS is transmitting the DL communications. Some aspects described herein reduce or eliminate self-interference that would otherwise occur at the BS due to the simultaneous reception and transmission described above.

FIG. 14B shows a second example deployment scenario in which some aspects described herein may be implemented. In this second example scenario, an IAB node (e.g., a first BS 110) communicates simultaneously with an IAB donor (e.g., a second BS 110) and a UE. As shown by reference number 1430, the IAB node may receive backhaul DL (low load) communications from the IAB donor. As shown by reference number 1440, the IAB node may transmit access DL (high load) communications to the UE on a same carrier as the backhaul DL communications. Some aspects described herein reduce or eliminate self-interference that would otherwise occur at the IAB node due to the simultaneous reception and transmission described above.

FIG. 14C shows a third example deployment scenario in which some aspects described herein may be implemented. In this third example scenario, an IAB node (e.g., a first BS 110) communicates simultaneously with an IAB donor (e.g., a second BS 110) and a UE. As shown by reference number 1450, the IAB node may transmit backhaul UL (high load) communications to the IAB donor. As shown by reference number 1460, the IAB node may receive access UL (low load) communications from the UE on a same carrier as the backhaul uplink communications. Some aspects described herein reduce or eliminate self-interference that would otherwise occur at the IAB node due to the simultaneous reception and transmission described above.

As indicated above, FIGS. 14A-14C are provided as one or more examples. Other examples may differ from what is described with respect to FIGS. 14A-14C.

Figure 15:
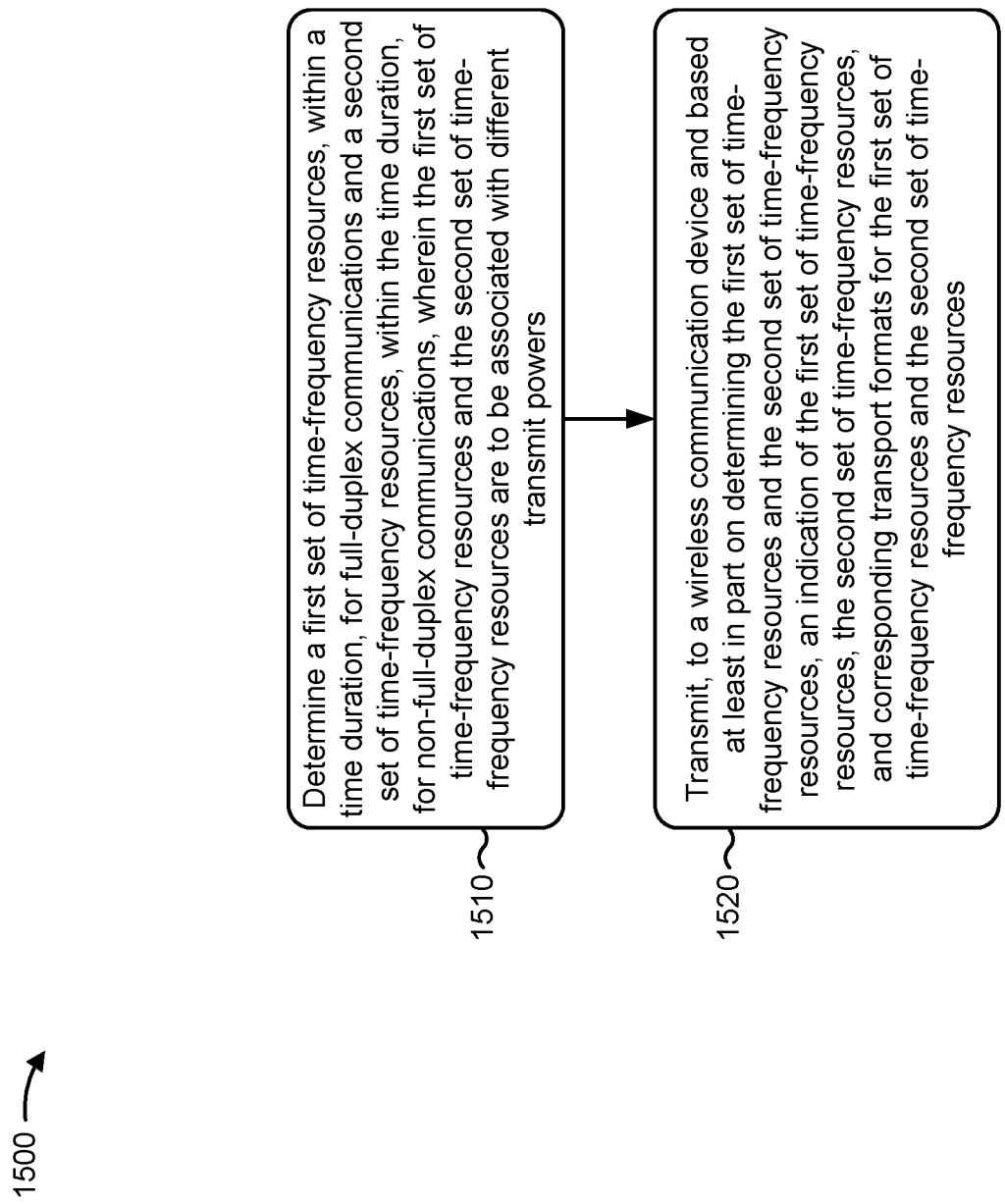
FIG. 15 is a diagram illustrating an example process performed, for example, by a base station (BS), in accordance with various aspects of the present disclosure.

FIG. 15 is a diagram illustrating an example process 1500 performed, for example, by a node, in accordance with various aspects of the present disclosure. Example process 1500 is an example where a node (e.g., base station (BS) 110, an IAB node, an IAB donor, and/or the like) performs operations associated with communicating multiple transport formats in a slot with full-duplex.

As shown in FIG. 15, in some aspects, process 1500 may include determining a first set of time-frequency resources, within a time duration, for full-duplex communications and a second set of time-frequency resources, within the time duration, for non-full-duplex communications, wherein the first set of time-frequency resources and the second set of time-frequency resources are to be associated with different transmit powers (block 1510). For example, the BS (e.g., using controller/processor 240, memory 242, and/or the like) may determine a first set of time-frequency resources, within a time duration (e.g., a slot), for full-duplex communications and a second set of time-frequency resources, within the time duration (e.g., the slot) for non-full-duplex communications, as described above. In some aspects, the first set of time-frequency resources and the second set of time-frequency resources are to be associated with different transmit powers.

As further shown in FIG. 15, in some aspects, process 1500 may include transmitting, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources (block 1520). For example, the BS (e.g., using transmit processor 220, TX MIMO processor 230, MOD 232, antenna 234, controller/processor 240, and/or the like) may transmit, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources, as described above.

Process 1500 may include additional aspects, such as any single aspect or any combination of aspects described below and/or in connection with one or more other processes described elsewhere herein. As used below, "slot" may be replaced with "time duration."

In a first aspect, a first transmit power, of the different transmit powers, for the first set of time-frequency resources is less than a second transmit power, of the different transmit powers, for the second set of time-frequency resources. In a second aspect, alone or in combination with the first aspect, the BS may transmit a first transport block on the first set of time-frequency resources based at least in part on transmitting the indication, wherein the first transport block is modulated by a first transport format of the corresponding transport formats, and transmitting a second transport block on the second set of time-frequency resources based at least in part on transmitting the indication, wherein the second transport block is modulated by a second transport format of the corresponding transport formats.

In a third aspect, alone or in combination with any one or more of the first and second aspects, the first set of time-frequency resources and the second set of time-frequency resources occupy fully overlapping frequency domain resources and occupy non-overlapping time domain resources. In a fourth aspect, alone or in combination with any one or more of the first through third aspects, the first set of time-frequency resources and the second set of time-frequency resources occupy fully overlapping time domain resources and occupy non-overlapping frequency domain resources. In a fifth aspect, alone or in combination with any one or more of the first through fourth aspects, the first set of time-frequency resources and the second set of time-frequency resources occupy partially overlapping time domain resources and partially overlapping frequency domain resources.

In a sixth aspect, alone or in combination with any one or more of the first through fifth aspects, the B S may determine a lower transmit power for the first set of time-frequency resources relative to the second set of time-frequency resources, may determine different modulation and coding scheme (MCS) values for corresponding transport blocks of the first set of time-frequency resources and the second set of time-frequency resources within a physical downlink shared channel (PDSCH) based at least in part on determining the lower transmit power, and may transmit the indication of the different MCS values to the wireless communication device based at least in part on determining the different MCS values. In a seventh aspect, alone or in combination with any one or more of the first through sixth aspects, the indication of the first set of time-frequency resources and the second set of time-frequency resources includes a high-layer signal that identifies corresponding positions in the slot for the first set of time-frequency resources and the second set of time-frequency resources, a high-layer signal that identifies possible slot partition patterns for the first set of time-frequency resources and the second set of time-frequency resources, wherein a particular slot partition pattern, of the possible slot partition patterns, is indicated by a media access control control element (MAC CE) separate from the indication, or slot-specific signaling that identifies the corresponding positions in the slot for the first set of time-frequency resources and the second set of time-frequency resources.

In an eighth aspect, alone or in combination with any one or more of the first through seventh aspects, the indication includes downlink control information (DCI) in a physical downlink control channel (PDCCH) communication. In a ninth aspect, alone or in combination with any one or more of the first through eighth aspects, a size of the DCI facilitates one or more indications related to one transport block associated with the first set of time-frequency resources and another transport block associated with the second set of time-frequency resources.

In a tenth aspect, alone or in combination with any one or more of the first through ninth aspects, a size of the DCI facilitates one or more indications related to the corresponding transport formats and to multiple corresponding transport blocks for the first set of time-frequency resources and the second set of time-frequency resources. In an eleventh aspect, alone or in combination with any one or more of the first through tenth aspects, the DCI is a single transmission of DCI to indicate positions in a slot for the first set of time-frequency resources and the second set of time-frequency resources, and to indicate the corresponding transport formats, or the DCI is two transmissions of linked DCI, wherein one of the two transmissions of linked DCI indicates a position in the slot for the first set of time-frequency resources and a first transport format, of the corresponding transport formats, for the first set of time-frequency resources, and wherein the other of the two transmissions of linked DCI indicates a position in the slot for the second set of time-frequency resources and a second transport format, of the corresponding transport formats, for the second set of time-frequency resources.

In a twelfth aspect, alone or in combination with any one or more of the first through eleventh aspects, the two transmissions of linked DCI are in a same control resource set (CORESET). In a thirteenth aspect, alone or in combination with any one or more of the first through twelfth aspects, the two transmissions of linked DCI are in different control resource sets (CORESETs). In a fourteenth aspect, alone or in combination with any one or more of the first through thirteenth aspects, the one of the two transmissions of linked DCI indicates an existence of the other of the two transmissions of linked DCI or a position in the slot of the other of the two transmissions of linked DCI.

In a fifteenth aspect, alone or in combination with any one or more of the first through fourteenth aspects, the DCI indicates use of at least one of time domain multiplexing for the first set of time-frequency resources and the second set of time-frequency resources, frequency domain multiplexing for the first set of time-frequency resources and the second set of time-frequency resources, or a combination of time domain multiplexing and frequency domain multiplexing for the first set of time-frequency resources and the second set of time-frequency resources. In a sixteenth aspect, alone or in combination with any one or more of the first through fifteenth aspects, the DCI indicates the use of time domain multiplexing via the single transmission of DCI, wherein a total set of time resources associated with the first set of time-frequency resources and the second set of time-frequency resources is indicated by a field in the DCI, and wherein the single transmission of DCI includes a bitmap that identifies which time resources of the total set of time resources are associated with the first set of time-frequency resources and which other time resources of the total set of time resources are associated with the second set of time-frequency resources.

In a seventeenth aspect, alone or in combination with any one or more of the first through sixteenth aspects, the DCI indicates the use of time domain multiplexing via the single transmission of DCI, wherein a total set of time resources associated with the first set of time-frequency resources and the second set of time-frequency resources is indicated by a first field in the DCI, and wherein particular time resources associated with the first set of time-frequency resources or the second set of time-frequency resources are indicated by a second field of the DCI. In an eighteenth aspect, alone or in combination with any one or more of the first through seventeenth aspects, the DCI indicates the use of time domain multiplexing via the two transmissions of linked DCI, wherein a first transmission of DCI, of the two transmissions of linked DCI, indicates time resources of one of the first set of time-frequency resources and the second set of time-frequency resources, and indicates the first transport format, of the corresponding transport formats, for the one of the first set of time-frequency resources and the second set of time-frequency resources, and wherein a second transmission of DCI, of the two transmissions of linked DCI, indicates other time resources of the other of the first set of time-frequency resources and the second set of time-frequency resources, and indicates the second transport format, of the corresponding transport formats, for the other of the first set of time-frequency resources and the second set of time-frequency resources, wherein the second transmission of DCI is detectable based at least in part on the first transmission of DCI.

In a nineteenth aspect, alone or in combination with any one or more of the first through eighteenth aspects, the DCI indicates the use of frequency domain multiplexing via the single transmission of DCI, wherein a total set of frequency resources associated with the first set of time-frequency resources and the second set of time-frequency resources is indicated by a field in the DCI, and wherein the DCI includes a bitmap that identifies which frequency resources of the total set of frequency resources are associated with the first set of time-frequency resources and which other frequency resources of the total set of frequency resources are associated with the second set of time-frequency resources. In a twentieth aspect, alone or in combination with any one or more of the first through nineteenth aspects, the DCI indicates the use of frequency domain multiplexing via the single transmission of DCI, wherein a total set of frequency resources associated with the first set of time-frequency resources and the second set of time-frequency resources is indicated by a first field in the DCI, and wherein particular frequency resources associated with the first set of time-frequency resources or the second set of time-frequency resources are indicated by a second field of the DCI.

In a twenty-first aspect, alone or in combination with any one or more of the first through twentieth aspects, the DCI indicates the use of frequency domain multiplexing via the two transmissions of linked DCI, wherein a first transmission of DCI, of the two transmissions of linked DCI, indicates frequency resources of one of the first set of time-frequency resources and the second set of time-frequency resources, and indicates the first transport format, of the corresponding transport formats, for the one of the first set of time-frequency resources and the second set of time-frequency resources, and wherein a second transmission of DCI, of the two transmissions of linked DCI, indicates other frequency resources of the other of the first set of time-frequency resources and the second set of time-frequency resources, and indicates the second transport format, of the corresponding transport formats, for the other of the first set of time-frequency resources and the second set of time-frequency resources, wherein the second transmission of DCI is detectable based at least in part on the first transmission of DCI. In a twenty-second aspect, alone or in combination with any one or more of the first through twenty-first aspects, the DCI indicates the use of the combination of time domain multiplexing and frequency domain multiplexing via the single transmission of DCI, wherein a total set of time resources and frequency resources associated with the first set of time-frequency resources and the second set of time-frequency resources is indicated by corresponding fields in the DCI, and wherein the DCI includes a bitmap that identifies which time resources and frequency resources, of the total set of time resources and frequency resources, are associated with the first set of time-frequency resources and which other time resources and frequency resources, of the total set of time resources and frequency resources, are associated with the second set of time-frequency resources.

In a twenty-third aspect, alone or in combination with any one or more of the first through twenty-second aspects, the DCI indicates the use of the combination of time domain multiplexing and frequency domain multiplexing via the single transmission of DCI, wherein a total set of time resources and frequency resources associated with the first set of time-frequency resources and the second set of time-frequency resources is indicated by first corresponding fields in the DCI, and wherein particular time resources and frequency resources associated with the first set of time-frequency resources or the second set of time-frequency resources are indicated by second corresponding fields of the DCI. In a twenty-fourth aspect, alone or in combination with any one or more of the first through twenty-third aspects, the DCI indicates the use of the combination of time domain multiplexing and frequency domain multiplexing via the two transmissions of linked DCI, wherein a first transmission of DCI, of the two transmissions of linked DCI, indicates time resources and frequency resources of one of the first set of time-frequency resources and the second set of time-frequency resources, and indicates the first transport format, of the corresponding transport formats, for the one of the first set of time-frequency resources and the second set of time-frequency resources, and wherein a second transmission of DCI, of the two transmissions of linked DCI, indicates other time resources and frequency resources of the other of the first set of time-frequency resources and the second set of time-frequency resources, and indicates the second transport format, of the corresponding transport formats, for the other of the first set of time-frequency resources and the second set of time-frequency resources, wherein the second transmission of DCI is detectable based at least in part on the first transmission of DCI.

In a twenty-fifth aspect, alone or in combination with any one or more of the first through twenty-fourth aspects, the B S may transmit, to the wireless communication device, a first demodulation reference signal (DMRS) for the first set of time-frequency resources and a second DMRS for the second set of time-frequency resources based at least in part on determining the first set of time-frequency resources and the second set of time-frequency resources, wherein a transmit power of the first DMRS is associated with a transmit power of the first set of time-frequency resources, and wherein a transmit power of the second DMRS is associated with a transmit power of the second set of time-frequency resources. In a twenty-sixth aspect, alone or in combination with any one or more of the first through twenty-fifth aspects, the B S may transmit, to the wireless communication device, a single demodulation reference signal (DMRS) for the second set of time-frequency resources based at least in part on determining the first set of time-frequency resources and the second set of time-frequency resources, and may transmit, based at least in part on transmitting the single DMRS, an indication of the different transmit powers, wherein the different transmit powers are based at least in part on a difference between the different transmit powers of the first set of time-frequency resources and the second set of time-frequency resources. In a twenty-seventh aspect, alone or in combination with any one or more of the first through twenty-sixth aspects, the time duration is one of a slot, a mini-slot, a subframe, a frame, or a number of symbols.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
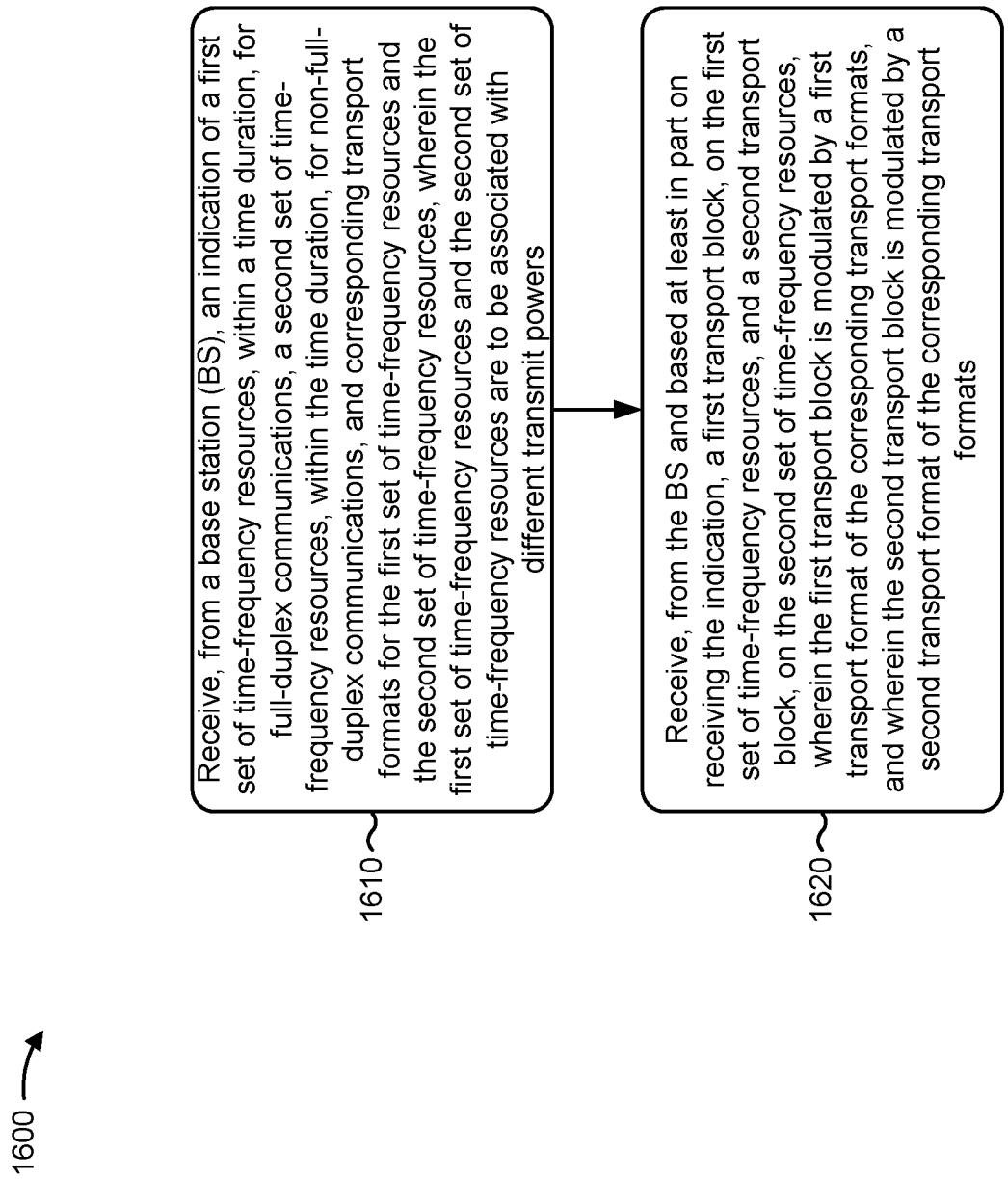
FIG. 16 is a diagram illustrating an example process performed, for example, by a wireless communication device, in accordance with various aspects of the present disclosure.

FIG. 16 is a diagram illustrating an example process 1600 performed, for example, by a wireless communication device, in accordance with various aspects of the present disclosure. Example process 1600 is an example where a wireless communication device (e.g., a BS 110, a UE 120, an IAB donor, an IAB node, and/or the like) performs operations associated with communicating multiple transport formats in a slot with full-duplex.

As shown in FIG. 16, in some aspects, process 1600 may include receiving, from a base station (BS), an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources, wherein the first set of time-frequency resources and the second set of time-frequency resources are to be associated with different transmit powers (block 1610). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, from a BS, an indication of a first set of time-frequency resources, within a time duration (e.g., a slot), for full-duplex communications, a second set of time-frequency resources within the time duration (e.g., the slot), for non-full-duplex communications, and corresponding transport formats for the first set of time-frequency resources and the second set of time-frequency resources, as described above. In some aspects, the first set of time-frequency resources and the second set of time-frequency resources are to be associated with different transmit powers.

As further shown in FIG. 16, in some aspects, process 1600 may include receiving, from the BS and based at least in part on receiving the indication, a first transport block, on the first set of time-frequency resources, and a second transport block, on the second set of time-frequency resources, wherein the first transport block is modulated by a first transport format of the corresponding transport formats, and wherein the second transport block is modulated by a second transport format of the corresponding transport formats (block 1620). For example, the wireless communication device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, from the BS and based at least in part on receiving the indication, a first transport block, on the first set of time-frequency resources, and a second transport block, on the second set of time-frequency resources, as described above. In some aspects, the first transport block is modulated by a first transport format of the corresponding transport formats. In some aspects, the second transport block is modulated by a second transport format of the corresponding transport formats.

Process 1600 may include additional aspects, such as any single aspect or any combination of aspects described below and/or in connection with one or more other processes described elsewhere herein. As used below, "slot" may be replaced with "time duration."

In a first aspect, a first transmit power, of the different transmit powers, for the first set of time-frequency resources is less than a second transmit power, of the different transmit powers, for the second set of time-frequency resources. In a second aspect, alone or in combination with the first aspect, the first set of time-frequency resources and the second set of time-frequency resources occupy fully overlapping frequency domain resources and occupy non-overlapping time domain resources. In a third aspect, alone or in combination with any one or more of the first and second aspects, the first set of time-frequency resources and the second set of time-frequency resources occupy fully overlapping time domain resources and occupy non-overlapping frequency domain resources. In a fourth aspect, alone or in combination with any one or more of the first through third aspects, the first set of time-frequency resources and the second set of time-frequency resources occupy partially overlapping time domain resources and partially overlapping frequency domain resources. In a fifth aspect, alone or in combination with any one or more of the first through fourth aspects, the indication indicates corresponding modulation and coding scheme (MCS) values for the first set of time-frequency resources and the second set of time-frequency resources within a physical downlink shared channel (PDSCH).

In a sixth aspect, alone or in combination with any one or more of the first through fifth aspects, the wireless communication device may demodulate, using the corresponding MCS values, the first transport block and the second transport block based at least in part on receiving the first transport block and the second transport block, and decoding the first transport block and the second transport block based at least in part on demodulating the first transport block and the second transport block. In a seventh aspect, alone or in combination with any one or more of the first through sixth aspects, the indication of the first set of time-frequency resources and the second set of time-frequency resources includes a high-layer signal that identifies corresponding positions in the slot for the first set of time-frequency resources and the second set of time-frequency resources, a high-layer signal that identifies possible slot partition patterns for the first set of time-frequency resources and the second set of time-frequency resources, wherein a particular slot partition pattern, of the possible slot partition patterns, is indicated by a media access control control element (MAC CE) separate from the indication, or slot-specific signaling that identifies the corresponding positions in the slot for the first set of time-frequency resources and the second set of time-frequency resources.

In an eighth aspect, alone or in combination with any one or more of the first through seventh aspects, the indication includes downlink control information (DCI) in a physical downlink control channel (PDCCH) communication. In a ninth aspect, alone or in combination with any one or more of the first through eighth aspects, a size of the DCI facilitates one or more indications related to one transport block associated with the first set of time-frequency resources and another transport block associated with the second set of time-frequency resources.

In a tenth aspect, alone or in combination with any one or more of the first through ninth aspects, a size of the DCI facilitates one or more indications related to the corresponding transport formats and to multiple corresponding transport blocks for the first set of time-frequency resources and the second set of time-frequency resources. In an eleventh aspect, alone or in combination with any one or more of the first through tenth aspects, the DCI is a single transmission of DCI to indicate positions in a slot for the first set of time-frequency resources and the second set of time-frequency resources and to indicate the corresponding transport formats, or the DCI is two transmissions of linked DCI, wherein one of the two transmissions of linked DCI indicates a position in the slot for the first set of time-frequency resources and the first transport format, of the corresponding transport formats, for the first set of time-frequency resources, and wherein the other of the two transmissions of linked DCI indicates a position in the slot for the second set of time-frequency resources and the second transport format, of the corresponding transport formats, for the second set of time-frequency resources.

In a twelfth aspect, alone or in combination with any one or more of the first through eleventh aspects, the two transmissions of linked DCI are in a same control resource set (CORESET). In a thirteenth aspect, alone or in combination with any one or more of the first through twelfth aspects, the two transmissions of linked DCI are in different control resource sets (CORESETs). In a fourteenth aspect, alone or in combination with any one or more of the first through thirteenth aspects, the one of the two transmissions of linked DCI indicates an existence of the other of the two transmissions of linked DCI or a position in the slot of the other of the two transmissions of linked DCI.

In a fifteenth aspect, alone or in combination with any one or more of the first through fourteenth aspects, the DCI indicates use of at least one of time domain multiplexing for the first set of time-frequency resources and the second set of time-frequency resources, frequency domain multiplexing for the first set of time-frequency resources and the second set of time-frequency resources, or a combination of time domain multiplexing and frequency domain multiplexing for the first set of time-frequency resources and the second set of time-frequency resources. In a sixteenth aspect, alone or in combination with any one or more of the first through fifteenth aspects, the DCI indicates the use of time domain multiplexing via the single transmission of DCI, wherein a total set of time resources associated with the first set of time-frequency resources and the second set of time-frequency resources is indicated by a field in the DCI, wherein the single transmission of DCI includes a bitmap that identifies which time resources of the total set of time resources are associated with the first set of time-frequency resources and which other time resources of the total set of time resources are associated with the second set of time-frequency resources.

In a seventeenth aspect, alone or in combination with any one or more of the first through sixteenth aspects, the DCI indicates the use of time domain multiplexing via the single transmission of DCI, wherein a total set of time resources associated with the first set of time-frequency resources and the second set of time-frequency resources is indicated by a first field in the DCI, and wherein particular time resources associated with the first set of time-frequency resources or the second set of time-frequency resources are indicated by a second field of the DCI. In an eighteenth aspect, alone or in combination with any one or more of the first through seventeenth aspects, the DCI indicates the use of time domain multiplexing via the two transmissions of linked DCI, wherein a first transmission of DCI, of the two transmissions of linked DCI, indicates time resources of one of the first set of time-frequency resources and the second set of time-frequency resources, and indicates the first transport format, of the corresponding transport formats, for the one of the first set of time-frequency resources and the second set of time-frequency resources, and wherein a second transmission of DCI, of the two transmissions of linked DCI, indicates other time resources of the other of the first set of time-frequency resources and the second set of time-frequency resources, and indicates the second transport format, of the corresponding transport formats, for the other of the first set of time-frequency resources and the second set of time-frequency resources, wherein the second transmission of DCI is detectable based at least in part on the first transmission of DCI.

In a nineteenth aspect, alone or in combination with any one or more of the first through eighteenth aspects, the DCI indicates the use of frequency domain multiplexing via the single transmission of DCI, wherein a total set of frequency resources associated with the first set of time-frequency resources and the second set of time-frequency resources is indicated by a field in the DCI, and wherein the DCI includes a bitmap that identifies which frequency resources, of the total set of frequency resources, are associated with the first set of time-frequency resources, and which other frequency resources, of the total set of frequency resources, are associated with the second set of time-frequency resources. In a twentieth aspect, alone or in combination with any one or more of the first through nineteenth aspects, the DCI indicates the use of frequency domain multiplexing via the single transmission of DCI, wherein a total set of frequency resources associated with the first set of time-frequency resources and the second set of time-frequency resources is indicated by a first field in the DCI, and wherein particular frequency resources associated with the first set of time-frequency resources or the second set of time-frequency resources are indicated by a second field of the DCI.

In a twenty-first aspect, alone or in combination with any one or more of the first through twentieth aspects, the DCI indicates the use of frequency domain multiplexing via the two transmissions of linked DCI, wherein a first transmission of DCI, of the two transmissions of linked DCI, indicates frequency resources of one of the first set of time-frequency resources and the second set of time-frequency resources, and indicates the first transport format, of the corresponding transport formats, for the one of the first set of time-frequency resources and the second set of time-frequency resources, and wherein a second transmission of DCI, of the two transmissions of linked DCI, indicates other frequency resources, of the other of the first set of time-frequency resources and the second set of time-frequency resources, and indicates the second transport format, of the corresponding transport formats, for the other of the first set of time-frequency resources and the second set of time-frequency resources, wherein the second transmission of DCI is detectable based at least in part on the first transmission of DCI.

In a twenty-second aspect, alone or in combination with any one or more of the first through twenty-first aspects, the DCI indicates the use of the combination of time domain multiplexing and frequency domain multiplexing via the single transmission of DCI, wherein a total set of time resources and frequency resources associated with the first set of time-frequency resources and the second set of time-frequency resources is indicated by corresponding fields in the DCI, and wherein the DCI includes a bitmap that identifies which time resources and frequency resources, of the total set of time resources and frequency resources, are associated with the first set of time-frequency resources and which other time resources and frequency resources, of the total set of time resources and frequency resources, are associated with the second set of time-frequency resources. In a twenty-third aspect, alone or in combination with any one or more of the first through twenty-second aspects, the DCI indicates the use of the combination of time domain multiplexing and frequency domain multiplexing via the single transmission of DCI, wherein a total set of time resources and frequency resources associated with the first set of time-frequency resources and the second set of time-frequency resources is indicated by first corresponding fields in the DCI, and wherein particular time resources and frequency resources associated with the first set of time-frequency resources or the second set of time-frequency resources are indicated by second corresponding fields of the DCI.

In a twenty-fourth aspect, alone or in combination with any one or more of the first through twenty-third aspects, the DCI indicates the use of the combination of time domain multiplexing and frequency domain multiplexing via the two transmissions of linked DCI, wherein a first transmission of DCI, of the two transmissions of linked DCI, indicates time resources and frequency resources of one of the first set of time-frequency resources and the second set of time-frequency resources, and indicates the first transport format, of the corresponding transport formats, for the one of the first set of time-frequency resources and the second set of time-frequency resources, and a second transmission of DCI, of the two transmissions of linked DCI, indicates other time resources and frequency resources of the other of the first set of time-frequency resources and the second set of time-frequency resources, and indicates the second transport format, of the corresponding transport formats, for the other of the first set of time-frequency resources and the second set of time-frequency resources, wherein the second transmission of DCI is detectable based at least in part on the first transmission of DCI. In a twenty-fifth aspect, alone or in combination with any one or more of the first through twenty-fourth aspects, the wireless communication device may receive, from the BS, a first demodulation reference signals (DMRSs) for the first set of time-frequency resources and a second DMRS for the second set of time-frequency resources prior to receiving the indication of the first set of time-frequency resources and the second set of time-frequency resources, wherein a transmit power of the first DMRS is associated with a transmit power of the first set of time-frequency resources, and wherein a transmit power of the second DMRS is associated with a transmit power of the second set of time-frequency resources. In a twenty-sixth aspect, alone or in combination with any one or more of the first through twenty-fifth aspects, the wireless communication device may receive, from the BS, a single demodulation reference signal (DMRS) for the second set of time-frequency resources, and may receive, based at least in part on receiving the single DMRS, an indication of the different transmit powers, wherein the different transmit powers are based at least in part on the single DMRS and a difference between the different transmit powers of the first set of time-frequency resources and the second set of time-frequency resources. In a twenty-seventh aspect, alone or in combination with any one or more of the first through twenty-sixth aspects, the time duration is one of a slot, a mini-slot, a subframe, a frame, or a number of symbols.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a node, comprising:
    determining a first set of time-frequency resources, within a time duration, for full-duplex communications and a second set of time-frequency resources, within the time duration, for non-full-duplex communications,
        wherein the first set of time-frequency resources and the second set of time-frequency resources are to be associated with different transmit powers; and
    transmitting, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources, wherein the first set of time-frequency resources are modulated by a first transport format of the corresponding transport formats and wherein the second set of time-frequency resources are modulated by a second transport format of the corresponding transport formats.

2. The method of claim 1, wherein a first transmit power, of the different transmit powers, for the first set of time-frequency resources is less than a second transmit power, of the different transmit powers, for the second set of time-frequency resources.

3. The method of claim 1, further comprising:
    transmitting a first transport block on the first set of time-frequency resources based at least in part on transmitting the indication,
    wherein the first transport block is modulated by the first transport format of the corresponding transport formats, and
    transmitting a second transport block on the second set of time-frequency resources based at least in part on transmitting the indication,
    wherein the second transport block is modulated by the second transport format of the corresponding transport formats.

4. The method of claim 1, wherein the first set of time-frequency resources and the second set of time-frequency resources occupy fully overlapping frequency domain resources and occupy non-overlapping time domain resources, occupy fully overlapping time domain resources and occupy non-overlapping frequency domain resources, or occupy partially overlapping time domain resources and partially overlapping frequency domain resources.

5. The method of claim 1, wherein the indication of the first set of time-frequency resources and the second set of time-frequency resources includes:
    a high-layer signal that identifies corresponding positions in the time duration for the first set of time-frequency resources and the second set of time-frequency resources,
    a high-layer signal that identifies possible partition patterns for the first set of time-frequency resources and the second set of time-frequency resources,
        wherein a particular partition pattern, of the possible partition patterns, is indicated by a media access control control element (MAC CE) separate from the indication, or
    time duration-specific signaling that identifies the corresponding positions in the time duration for the first set of time-frequency resources and the second set of time-frequency resources.

6. The method of claim 1, wherein the indication includes downlink control information (DCI) in a physical downlink control channel (PDCCH) communication, wherein:
    the DCI is a single transmission of DCI to indicate positions in the time duration for the first set of time-frequency resources and the second set of time-frequency resources and to indicate the corresponding transport formats, or
    the DCI is two transmissions of linked DCI,
    wherein one of the two transmissions of linked DCI indicates a position in the time duration for the first set of time-frequency resources and a first transport format, of the corresponding transport formats, for the first set of time-frequency resources,
    wherein the other of the two transmissions of linked DCI indicates a position in the time duration for the second set of time-frequency resources and a second transport format, of the corresponding transport formats, for the second set of time-frequency resources, and
    wherein the one of the two transmissions of linked DCI indicates an existence of the other of the two transmissions of linked DCI or a position in the time duration of the other of the two transmissions of linked DCI.

7. The method of claim 6, wherein the DCI indicates use of at least one of:
    time domain multiplexing for the first set of time-frequency resources and the second set of time-frequency resources,
    frequency domain multiplexing for the first set of time-frequency resources and the second set of time-frequency resources, or
    a combination of time domain multiplexing and frequency domain multiplexing for the first set of time-frequency resources and the second set of time-frequency resources.

8. The method of claim 7, wherein the DCI indicates the use of at least one of time domain multiplexing or frequency domain multiplexing via the single transmission of DCI,
    wherein at least one of a total set of time resources or a total set of frequency resources associated with the first set of time-frequency resources and the second set of time-frequency resources is indicated by a field in the DCI, and
wherein the single transmission of DCI includes a bitmap that identifies at least one of which time resources of the total set of time resources or which frequency resources of the total set of frequency resources are associated with the first set of time-frequency resources and at least one of which other time resources of the total set of time resources or which other frequency resources of the total set of frequency resources are associated with the second set of time-frequency resources.

9. The method of claim 7, wherein the DCI indicates the use of at least one of time domain multiplexing or frequency domain multiplexing via the single transmission of DCI,
wherein at least one of a total set of time resources or a total set of frequency resources associated with the first set of time-frequency resources and the second set of time-frequency resources is indicated by a first field in the DCI, and
wherein at least one of particular time resources or particular frequency resources associated with the first set of time-frequency resources or the second set of time-frequency resources are indicated by a second field of the DCI.

10. The method of claim 7, wherein the DCI indicates the use of at least one of time domain multiplexing or frequency domain multiplexing via the two transmissions of linked DCI,
wherein a first transmission of DCI, of the two transmissions of linked DCI, indicates at least one of time resources or frequency resources of one of the first set of time-frequency resources and the second set of time-frequency resources, and indicates the first transport format, of the corresponding transport formats, for the one of the first set of time-frequency resources and the second set of time-frequency resources, and
wherein a second transmission of DCI, of the two transmissions of linked DCI, indicates at least one of other time resources or other frequency resources of the other of the first set of time-frequency resources and the second set of time-frequency resources, and indicates the second transport format, of the corresponding transport formats, for the other of the first set of time-frequency resources and the second set of time-frequency resources,
wherein the second transmission of DCI is detectable based at least in part on the first transmission of DCI.

11. The method of claim 1, further comprising:
transmitting, to the wireless communication device, a first demodulation reference signal (DMRS) for the first set of time-frequency resources and a second DMRS for the second set of time-frequency resources based at least in part on determining the first set of time-frequency resources and the second set of time-frequency resources,
wherein a transmit power of the first DMRS is associated with a transmit power of the first set of time-frequency resources, and
wherein a transmit power of the second DMRS is associated with a transmit power of the second set of time-frequency resources.

12. The method of claim 1, further comprising:
transmitting, to the wireless communication device, a single demodulation reference signal (DMRS) for the second set of time-frequency resources based at least in part on determining the first set of time-frequency resources and the second set of time-frequency resources; and
transmitting, based at least in part on transmitting the single DMRS, an indication of the different transmit powers,
wherein the different transmit powers are based at least in part on a difference between the different transmit powers of the first set of time-frequency resources and the second set of time-frequency resources.

13. The method of claim 1, wherein the time duration is one of a slot, a mini-slot, a subframe, a frame, or a number of symbols.

14. A method of wireless communication performed by a wireless communication device, comprising:
receiving an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources,
wherein the first set of time-frequency resources and the second set of time-frequency resources are to be associated with different transmit powers; and
receiving, based at least in part on receiving the indication, a first transport block, on the first set of time-frequency resources, and a second transport block, on the second set of time-frequency resources,
wherein the first transport block is modulated by a first transport format of the corresponding transport formats, and
wherein the second transport block is modulated by a second transport format of the corresponding transport formats.

15. The method of claim 14, wherein a first transmit power, of the different transmit powers, for the first set of time-frequency resources is less than a second transmit power, of the different transmit powers, for the second set of time-frequency resources.

16. The method of claim 14, wherein the first set of time-frequency resources and the second set of time-frequency resources occupy fully overlapping frequency domain resources and occupy non-overlapping time domain resources, occupy fully overlapping time domain resources and occupy non-overlapping frequency domain resources, or occupy partially overlapping time domain resources and partially overlapping frequency domain resources.

17. The method of claim 14, wherein the indication of the first set of time-frequency resources and the second set of time-frequency resources includes:
a high-layer signal that identifies corresponding positions in the time duration for the first set of time-frequency resources and the second set of time-frequency resources, and
a high-layer signal that identifies possible partition patterns for the first set of time-frequency resources and the second set of time-frequency resources,
wherein a particular partition pattern, of the possible partition patterns, is indicated by a media access control control element (MAC CE) separate from the indication, or
time duration-specific signaling that identifies the corresponding positions in the time duration for the first set of time-frequency resources and the second set of time-frequency resources.

18. The method of claim 14, wherein the indication includes downlink control information (DCI) in a physical downlink control channel (PDCCH) communication, wherein:
the DCI is a single transmission of DCI to indicate positions in the time duration for the first set of time-frequency resources and the second set of time-frequency resources and to indicate the corresponding transport formats, or
the DCI is two transmissions of linked DCI,
wherein one of the two transmissions of linked DCI indicates a position in the time duration for the first set of time-frequency resources and the first transport format, of the corresponding transport formats, for the first set of time-frequency resources,
wherein the other of the two transmissions of linked DCI indicates a position in the time duration for the second set of time-frequency resources and the second transport format, of the corresponding transport formats, for the second set of time-frequency resources, and
wherein the one of the two transmissions of linked DCI indicates an existence of the other of the two transmissions of linked DCI or a position in the time duration of the other of the two transmissions of linked DCI.

19. The method of claim 18, wherein the DCI indicates use of at least one of:
time domain multiplexing for the first set of time-frequency resources and the second set of time-frequency resources,
frequency domain multiplexing for the first set of time-frequency resources and the second set of time-frequency resources, or
a combination of time domain multiplexing and frequency domain multiplexing for the first set of time-frequency resources and the second set of time-frequency resources.

20. The method of claim 19, wherein the DCI indicates the use of at least one of time domain multiplexing or frequency domain multiplexing via the single transmission of DCI,
wherein at least one of a total set of time resources or a total set of frequency resources associated with the first set of time-frequency resources and the second set of time-frequency resources is indicated by a field in the DCI, and
wherein the single transmission of DCI includes a bitmap that identifies at least one of which time resources of the total set of time resources or which frequency resources of the total set of frequency resources are associated with the first set of time-frequency resources and at least one of which other time resources of the total set of time resources or which other frequency resources of the total set of frequency resources are associated with the second set of time-frequency resources.

21. The method of claim 19, wherein the DCI indicates the use of at least one of time domain multiplexing or frequency domain multiplexing via the single transmission of DCI,
wherein at least one of a total set of time resources or a total set of frequency resources associated with the first set of time-frequency resources and the second set of time-frequency resources is indicated by a first field in the DCI, and
wherein at least one of particular time resources or particular frequency resources associated with the first set of time-frequency resources or the second set of time-frequency resources are indicated by a second field of the DCI.

22. The method of claim 19, wherein the DCI indicates the use of at least one of time domain multiplexing or frequency domain multiplexing via the two transmissions of linked DCI,
wherein a first transmission of DCI, of the two transmissions of linked DCI, indicates at least one of time resources or frequency resources of one of the first set of time-frequency resources and the second set of time-frequency resources, and indicates the first transport format, of the corresponding transport formats, for the one of the first set of time-frequency resources and the second set of time-frequency resources, and
wherein a second transmission of DCI, of the two transmissions of linked DCI, indicates at least one of other time resources or other frequency resources of the other of the first set of time-frequency resources and the second set of time-frequency resources, and indicates the second transport format, of the corresponding transport formats, for the other of the first set of time-frequency resources and the second set of time-frequency resources,
wherein the second transmission of DCI is detectable based at least in part on the first transmission of DCI.

23. The method of claim 14, further comprising:
receiving a first demodulation reference signal (DMRS) for the first set of time-frequency resources and a second DMRS for the second set of time-frequency resources prior to receiving the indication of the first set of time-frequency resources and the second set of time-frequency resources,
wherein a transmit power of the first DMRS is associated with a transmit power of the first set of time-frequency resources, and
wherein a transmit power of the second DMRS is associated with a transmit power of the second set of time-frequency resources.

24. The method of claim 14, further comprising:
receiving a single demodulation reference signal (DMRS) for the second set of time-frequency resources; and
receiving, based at least in part on receiving the single DMRS, an indication of the different transmit powers,
wherein the different transmit powers are based at least in part on the single DMRS and a difference between the different transmit powers of the first set of time-frequency resources and the second set of time-frequency resources.

25. The method of claim 14, wherein the time duration is one of a slot, a mini-slot, a subframe, a frame, or a number of symbols.

26. A node for wireless communication, comprising:
memory; and
one or more processors operatively coupled to the memory, the memory and the one or more processors configured to:
determine a first set of time-frequency resources, within a time duration, for full-duplex communications and a second set of time-frequency resources, within the time duration, for non-full-duplex communications,
wherein the first set of time-frequency resources and the second set of time-frequency resources are to be associated with different transmit powers; and
transmit, to a wireless communication device and based at least in part on determining the first set of time-frequency resources and the second set of time-frequency resources, an indication of the first set of time-frequency resources, the second set of time-frequency resources, and corresponding transport formats for the first set of time-frequency resources and the second set of time-frequency resources, wherein the first set of time-frequency resources are modulated by a first transport format of the corresponding transport formats and wherein the second set of time-frequency resources are modulated by a second transport format of the corresponding transport formats.

27. The node of claim 26, wherein the indication includes downlink control information (DCI) in a physical downlink control channel (PDCCH) communication, wherein;
the DCI is a single transmission of DCI to indicate positions in the time duration for the first set of time-frequency resources and the second set of time-frequency resources and to indicate the corresponding transport formats, or
the DCI is two transmissions of linked DCI,
wherein one of the two transmissions of linked DCI indicates a position in the time duration for the first set of time-frequency resources and a first transport format, of the corresponding transport formats, for the first set of time-frequency resources,
wherein the other of the two transmissions of linked DCI indicates a position in the time duration for the second set of time-frequency resources and a second transport format, of the corresponding transport formats, for the second set of time-frequency resources, and
wherein the one of the two transmissions of linked DCI indicates an existence of the other of the two transmissions of linked DCI or a position in the time duration of the other of the two transmissions of linked DCI.

28. The node of claim 27, wherein the DCI indicates use of at least one of:
time domain multiplexing for the first set of time-frequency resources and the second set of time-frequency resources,
frequency domain multiplexing for the first set of time-frequency resources and the second set of time-frequency resources, or
a combination of time domain multiplexing and frequency domain multiplexing for the first set of time-frequency resources and the second set of time-frequency resources.

29. A wireless communication device for wireless communication, comprising:
memory; and
one or more processors operatively coupled to the memory, the memory and the one or more processors configured to:
receive an indication of a first set of time-frequency resources, within a time duration, for full-duplex communications, a second set of time-frequency resources, within the time duration, for non-full-duplex communications, and corresponding transport formats for the first set of time-frequency resources and the second set of time-frequency resources,
wherein the first set of time-frequency resources and the second set of time-frequency resources are to be associated with different transmit powers; and
receive, based at least in part on receiving the indication, a first transport block, on the first set of time-frequency resources, and a second transport block, on the second set of time-frequency resources,
wherein the first transport block is modulated by a first transport format of the corresponding transport formats, and
wherein the second transport block is modulated by a second transport format of the corresponding transport formats.

30. The wireless communication device of claim 29, wherein the indication includes downlink control information (DCI) in a physical downlink control channel (PDCCH) communication: wherein the DCI is a single transmission of DCI to indicate positions in the time duration for the first set of time-frequency resources and the second set of time-frequency resources and to indicate the corresponding transport formats, or
the DCI is two transmissions of linked DCI,
wherein one of the two transmissions of linked DCI indicates a position in the time duration for the first set of time-frequency resources and the first transport format, of the corresponding transport formats, for the first set of time-frequency resources,
wherein the other of the two transmissions of linked DCI indicates a position in the time duration for the second set of time-frequency resources and the second transport format, of the corresponding transport formats, for the second set of time-frequency resources, and
wherein the one of the two transmissions of linked DCI indicates an existence of the other of the two transmissions of linked DCI or a position in the time duration of the other of the two transmissions of linked DCI.

* * * * *